US006289974B1

United States Patent
DeGregoria et al.

(10) Patent No.: US 6,289,974 B1
(45) Date of Patent: *Sep. 18, 2001

(54) INTEGRATED HEAT RECOVERY VENTILATOR HEPA FILTER USING A HEPA FILTER MATERIAL REGENERATIVE HEAT EXCHANGER

(75) Inventors: Anthony J. DeGregoria; Thomas J. Kaminski, both of Madison, WI (US)

(73) Assignee: ElasTek, Inc., Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/082,171

(22) Filed: May 20, 1998

Related U.S. Application Data

(63) Continuation-in-part of application No. 08/893,833, filed on Jul. 11, 1997.

(51) Int. Cl.[7] .................................................. F23L 15/02
(52) U.S. Cl. ................................ 165/8; 165/10; 165/54
(58) Field of Search ................................ 165/54, 8, 10

(56) References Cited

U.S. PATENT DOCUMENTS

| D. 376,842 | 12/1996 | Franklin et al. . |
|---|---|---|
| 2,931,189 | 4/1960 | Sigworth . |
| 3,036,444 | 5/1962 | Cochran . |
| 3,047,272 | 7/1962 | Speca . |
| 3,326,214 | 6/1967 | McCoy . |
| 3,599,443 | 8/1971 | Paine . |
| 3,978,912 | 9/1976 | Penny et al. . |

(List continued on next page.)

FOREIGN PATENT DOCUMENTS

| 3143088 A1 | 5/1983 | (DE) . |
|---|---|---|
| 895463 | 5/1962 | (GB) . |
| 1360064 | 7/1974 | (GB) . |

OTHER PUBLICATIONS

ASHRAE 62–1989 Standard of American Society of Heating, Refrigeration, and Air Conditioning Engineers Inc., Atlanta, GA (contents page, pp1, 3–26) (1989).

"From concept to consumer, Columbus Industries is your single–source solution for custom filters." Columbus Industries, Inc., Ashville, OH (discloses High Efficiency Particulate Air (HEPA) filter) pp. 1–6.

"Lifebreath™ Central Ventilation Systems", Nutech Energy Systems, Inc., London Ontario, Canada (pp. 1–12).

(List continued on next page.)

Primary Examiner—Christopher Atkinson
(74) Attorney, Agent, or Firm—Michael Best & Friedrich LLP

(57) ABSTRACT

A heat recovery ventilator includes four rectangular regenerative heat exchangers, two blowers, a rotating air switch all disposed in a compact rectangular housing. The regenerative heat exchangers are made of a pleated HEPA filter material. The HEPA filter material captures at least 99.97% of particles having a diameter greater than 0.3 microns. Alternatively, the HEPA filter material is rated at least 85% Dust-Spot Efficiency percentage as measured by ASHRAE Standard 52.1-1992, Dust-Spot Procedure. The regenerative heat exchangers are stationary with stationary seals between the outside and inside climate. One of the blowers blows a stale airstream out through the heat exchangers; the other blower blows a fresh airstream in through the heat exchangers. The rotating air switch operates in conjunction with the two blowers producing the necessary flow reversal through each regenerative heat exchanger to allow heat and moisture exchange between the stale airstream and the fresh airstream. The rotating air switch is completely on the inside climate side of the regenerative heat exchangers preventing freeze up in cold weather. The rotating air switch uses clearance seals.

13 Claims, 17 Drawing Sheets

U.S. PATENT DOCUMENTS

| | | |
|---|---|---|
| 4,049,404 | 9/1977 | Johnson . |
| 4,391,321 | 7/1983 | Thunberg . |
| 4,411,310 | 10/1983 | Perry et al. . |
| 4,493,366 | 1/1985 | Ekman . |
| 4,512,392 | 4/1985 | van Ee et al. . |
| 4,577,678 | 3/1986 | Franenfeld et al. . |
| 4,589,476 | 5/1986 | Berner . |
| 4,594,860 | 6/1986 | Coellner et al. . |
| 4,629,482 | 12/1986 | Davis . |
| 4,665,805 | 5/1987 | Ekman . |
| 4,685,944 | 8/1987 | Allen et al. . |
| 4,688,626 | 8/1987 | Tengesdal . |
| 4,733,718 | 3/1988 | Schikowsky et al. . |
| 4,744,409 | 5/1988 | Berner . |
| 4,754,806 | 7/1988 | Astle, Jr. . |
| 4,815,522 | 3/1989 | Thunberg . |
| 4,817,708 | 4/1989 | Ono et al. . |
| 4,875,520 | 10/1989 | Steele et al. . |
| 4,952,283 | 8/1990 | Besik . |
| 5,002,116 | 3/1991 | Hoagland . |
| 5,010,594 | 4/1991 | Suzuki et al. . |
| 5,050,667 | 9/1991 | Berner et al. . |
| 5,273,106 | 12/1993 | Drake . |
| 5,306,321 | 4/1994 | Osendorf . |
| 5,339,653 | 8/1994 | DeGregoria . |
| 5,375,649 | 12/1994 | Nilsen et al. . |
| 5,617,913 | 4/1997 | DeGregoria et al. . |

OTHER PUBLICATIONS

TherMax Energy Recycling Ventilation Systems, "Energy Recycling Ventilation Systems for Improved IAQ", Division of Kooltronic, Inc., Hopewell, New Jersey (34 pages of product information).

Douglas Steege, Altech Energy New Aire™ Air–to–Air Heat Exchanger Ventilators, Madison, Wisconsin (1994) 12 pages (6 sheets).

Honeywell, "The 'Perfect Window' Energy Recovery Ventilator" Product Reference, Golden Valley, Minnesota Sep. 1991 (51 sheets).

Reay, "Heat Recovery Systems A directory of equipment and techniques", E. & F. N. Spon, 1979, pp. 17–35.

Merrill, "Maintaining Your Home", Housing Specialist, University of Wisconsin–Extension—Cooperative Extension (1989) (pp 1–2 on 1 sheet).

"HRV700i" Venmar Ventilation, Inc. ©1995, Saskatchewan, Canada (pp 1–2 on 1 sheet).

"The Fresh Approach to Improved Air Quality" Raydot Incorporated, Oct. 1992 10M TH, Cokato, Minnesota (pp 1–4).

"Indoor Air Quality–An Issue That Hits You Where You Live", Guardian™, Broan®, Hartford, Wisconsin, 1993 (pp. 1–12).

"Energy Recovery Wheel", Carnes® Company, Verona, Wisconsin, Catalog HW–01G, Nov. 1989 (pp. 1–12).

"General Product Catalog", Carnes™ Company, Verona, Wisconsin, Catalog CG–09K, Jun. 1993 (pp. 1–20).

"Energy Recovery Ventilator", Carnes® Company, Verona, Wisconsin, Catalog HV–01E, Sep. 1991 (pp. 1–14).

"Energy Recovery Wheel Systems", Carnes® Company, Verona, Wisconsin, Catalog HS–01E, Apr. 1991 (pp. 1–28).

Merrill, "Is Home Ventilation A Luxury?", Housing Specialist, University of Wisconsin–Extension—Cooperative Extension (1 page).

Indoor Air Pollution, An Introduction for Health Professionals (pp i, 1).

"Indoor Air Update—1996 Agenda", College of Agricultural and Life Sciences—University of Wisconsin–Madison (1 page).

"Indoor Air Quality" UW–Extension Family Living (pp 1–2 on 1 sheet).

"Indoor Air Quality Tools for Schools", IAQ Coordinator's Guide, (pp. ii–iv, 1–2).

Merrill et al., "Maintaining Your Home: Lead–Based Paint Hazards", Cooperative Extension Publications, Madison, Wisconsin, Jan. 9, 1995 (pp1–3 and resources sheet).

"Carbon Monoxide", Wisconsin Division of Health, Jan. 1993 (3 sheets).

Chisholm, "Developments in Heat Exchanger Technology–1" *National Engineering Laboratory,* 1980 (pp. 233–257).

Walker, "Industrial heat exchangers a basic guide", Chemical Engineering, 1983 (pp. 311–321).

"40% Rise Reported in Asthma and Asthma Deaths", *New York Times,* Jan. 6, 1995 (1 page).

"Heat Recovery Ventilation for Housing: Air–to–Air Heat Exchangers", National Center for Appropriate Technology, Butte, Montana, prior to Mar. 1984 (pp. 1–32).

"Major Air Pollutants in the Home" University of Wisconsin–Extension, Cooperative Extension (3 pages on 2 sheets).

Altech Energy (©1988), New Aire™ Air–to–Air Heat Exchange Ventilators, Madison, Wisconsin (16 sheets).

Airxchange, "Energy Recovery Ventilation", (Catalog) Rockland, Massachusetts, 1992 (41 sheets).

N.F. Hodgkinson, "Alternatives to Halocarbons in Air Conditioning, Refrigeration and Fire Protection", Australian Refrigeration, Air Conditioning and Heating, Jul. 1990 pp 42–43, 45, 47–48.

American Lung Association, Washington, DC 20036, "Residential Air Cleaning Devices: Types Effectiveness and Health Impact" Jan. 1997 pp. 1–52.

Allergy Asthma Technology Ltd., Morton Grove, IL Nov. 1996, pp 8–9.

Allergy Control Products, Inc., Ridgefield, CT (©1997) pp. 11, 12, 21.

"Test Performance of High Efficiency Particulate Air Filter Units" UL 586 Underwriters Laboratories, Inc., (1997) pp. 1–9.

"Air Cleaning Systems and Indoor Air Quality: A Review", USA CERL TR FE—95/10 (1995) pp. 17–20, 24, 69–70.

"Air Filters for Use at Nuclear Facilities" International Atomic Energy Agency, Vienna (IAEA) 1970, p. 16–42.

White and Smith "High Energy Air Filtration", 1964 Butterworth & Co. (Publishers) Ltd, London pp. 143–149.

"Hygroster Filer HME for Respiratory System", Mallinckrodt Medica, St. Louis, MO, 1994, 2 sheets.

"Breathing System Filter with Flex Tube", BB 100 F Pall Biomedical, Inc. Fajardo, PR. 2 sheets (date not known) and photo sheet.

"Federal Standard Clean Room and Work Station Requirements, Controlled Environment" Fed. Std. No. 209B Apr. 24, 1973, pp. 11 General Services Administration.

High Efficiency Pleated and Mini–Pleated Air Filters; Columbus Industries, Inc., Ashville, OH (2 pgs).

MIL–STD–282 Method 102.9.1 US Government Printing Office Washington, DC pp. 33–38 and Fig. 9 (May 28, 1956).

ASHRAE Standard 52.1–1992 Gravemetric "Dust Spot Procedures for Testing Air–Cleaning Devices Used in General Ventilation for Removing Particulate Matter", American Society of Heating Refrigerating and Air–Conditioning Engineers Inc., Atlanta, GA 1992. pp. 1–32.

"Building Air Quality A Guide for Building Owners and Facility Managers" EPA/400/1–91/033 DHHS (Niosh) Publications No. 91–114 pp. 126–128 (1991).

HEPA Corporation, Anaheim, CA, HEPA–Pleat II® Rising Above the Pack: (10 pgs) 1992.

HEPA Corporation, Anaheim, CA, HEPA–Gard® HEPA–Sep® HEPA–Pleat II® HEPA–Specials HEPA–Plus™ HEPA–Hood™ HEPA–Gel™ (6 pgs.) 1993.

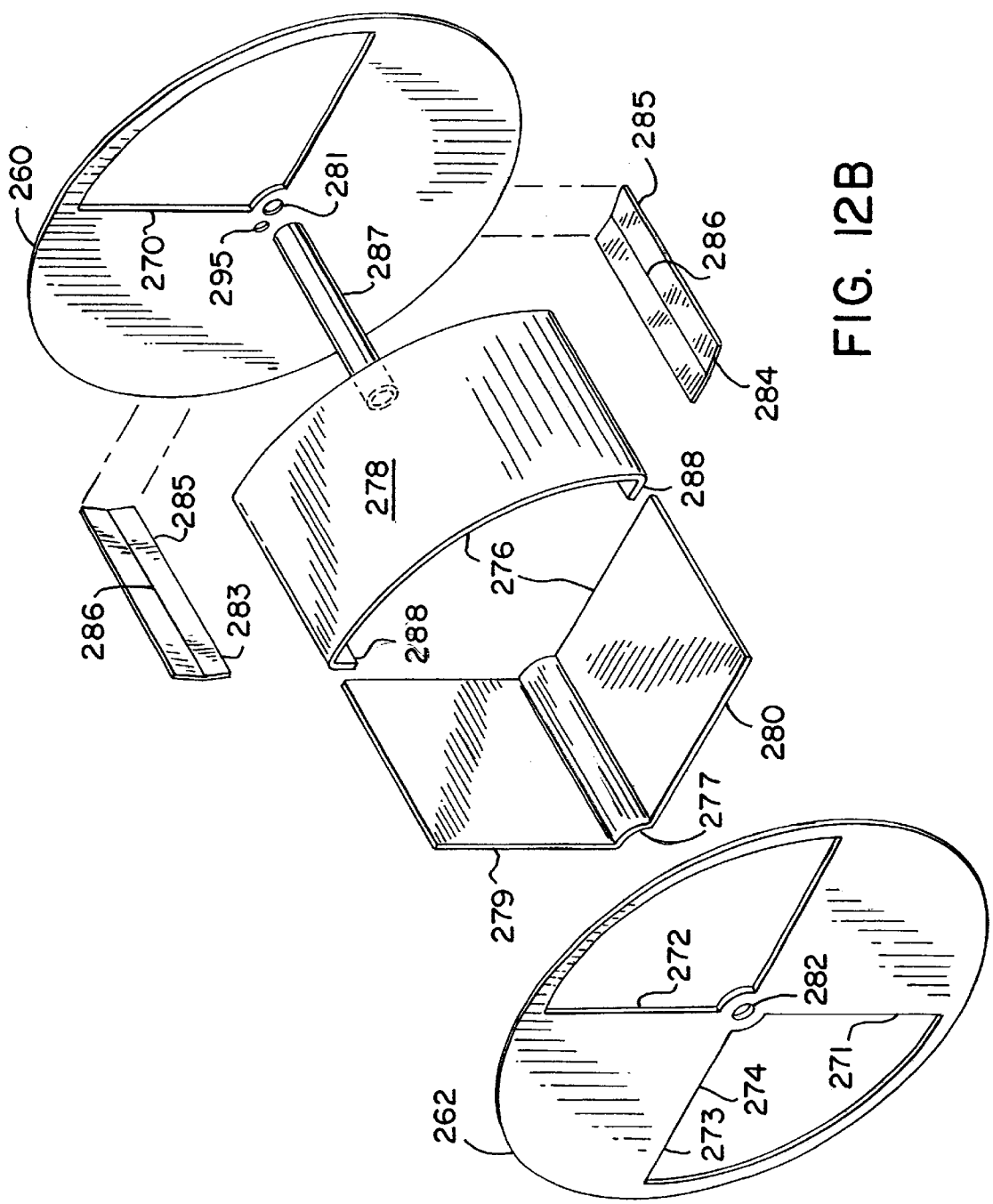

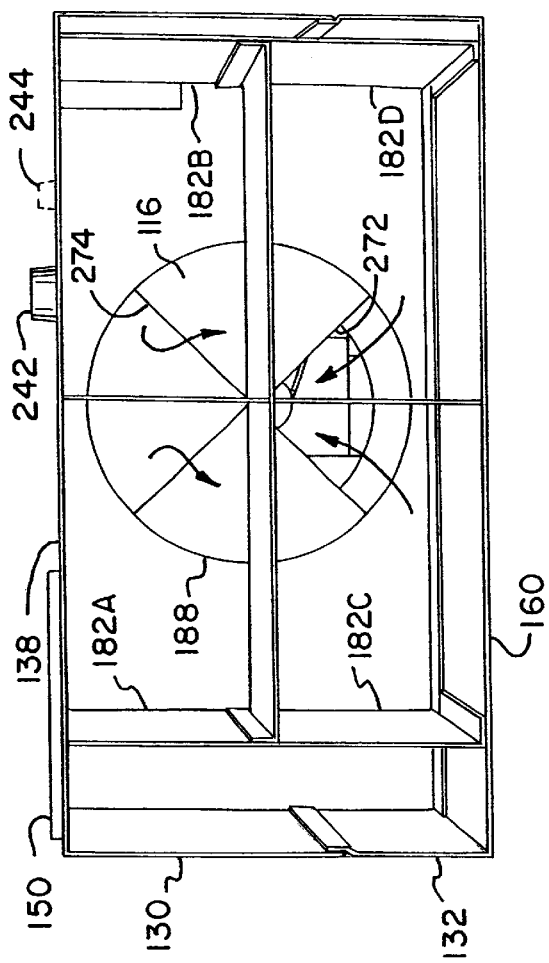
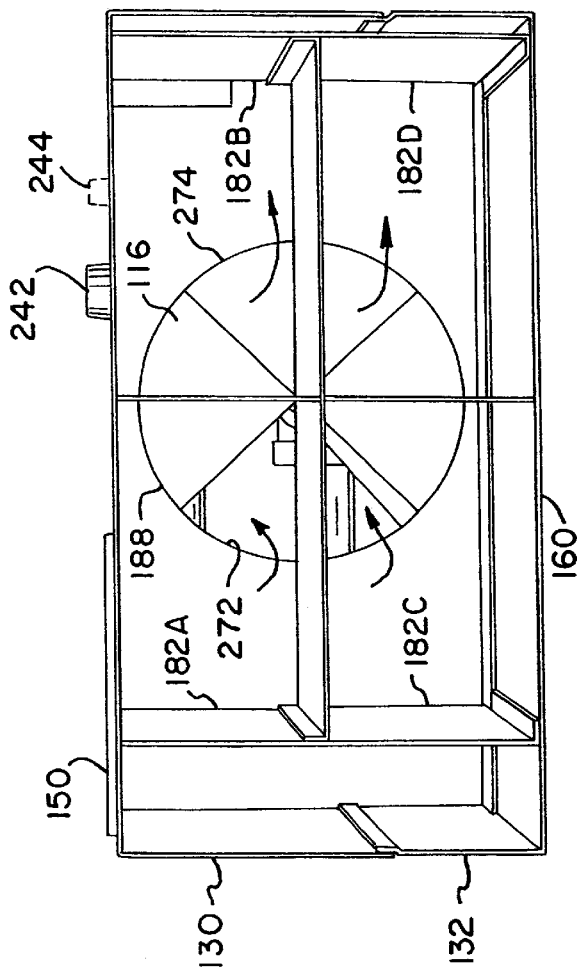
FIG. 13A
FIG. 13B

INTEGRATED HEAT RECOVERY VENTILATOR HEPA FILTER USING A HEPA FILTER MATERIAL REGENERATIVE HEAT EXCHANGER

CROSS-REFERENCE TO RELATED APPLICATIONS

This is a continuation-in-part of U.S. application Ser. No. 08/893,833 filed Jul. 11, 1997.

STATEMENT REGARDING FEDERALLY SPONSORED RESEARCH OR DEVELOPMENT

Not Applicable

BACKGROUND OF THE INVENTION

This invention relates generally to heat transfer devices and air filtration devices, and in particular to heat exchangers, ventilators, and enthalpy exchangers along with air filters. The invention is particularly well-suited for air-to-air regenerative heat exchangers utilizing high efficiency particulate air (HEPA) filter material as the regenerative heat exchanger.

Many individuals suffer from respiratory disorders, including allergies and asthma. In recent decades, scientists have known that poor quality indoor air seriously impacts human health. (American Lung Association, Washington, D.C. 20036, "Residential Air cleaning Devices: Types, Effectiveness and Health Impact", 1997) Reduction of indoor pollution helps alleviate the suffering of these individuals. Efforts to reduce indoor air pollution have been directed to three areas: ventilation, air cleaning and source control. The problem of providing adequate indoor ventilation is well known.

Modern energy efficient construction employs air "tight" structures to restrict infiltration of outside air. Lack of infiltration or natural ventilation has resulted in inadequate indoor ventilation. Standard 62-1989 of American Society of Heating, Refrigeration, and Air conditioning Engineers Inc. (ASHRAE), Atlanta, Georgia, states, "When infiltration and natural ventilation are insufficient to meet ventilation air requirements, mechanical ventilation shall be provided. The use of energy recovery ventilation systems should be considered for energy conservation purposes in meeting ventilation requirements." (Sec. 5.1.) Standard 62-1989 suggests 0.35 air changes per hour of continuous fresh air for living areas, but not less than 15 Cubic Feet per Minute (CFM) per person based on design occupancy. For a 2500 square-foot home, this equates to about 120 CFM.

Bringing outside air into a structure for ventilation purpose can be problematic and expensive. Utilizing gas or electric heat to preheat separate ventilation air in winter is inefficient. For example, if the outside air is 20° C. colder than indoors, approximately 1.2 kW of heat is required to preheat the 120 CFM of required ventilation for a 2500 square-foot home. Use of a heat recovery ventilator is by far the most efficient way to ventilate, exchanging as much as 85% of the heat from warm (inside) exhaust air with the cool fresh air. In summer, use of a heat recovery ventilator also reduces air-conditioning load by exchanging cool dry exhaust air with warm humid fresh air. An "enthalpy" exchanger has been found to be particularly effective in humid climates.

Some prior art air-to-air heat exchanger technology for home use utilize a cross-flow heat exchanger core, e.g., Lifebreath™ heat recovery ventilator by Nutech Energy Systems, Inc. of London, Ontario, Canada; TherMax TW Model room ventilators made by Thermax Energy Recycling Ventilation Systems, Division of Kooltronic, Inc. of Hopewell, N.J.; NewAire™ air-to-air heat exchange ventilators made by Altech Energy of Madison, Wis.; U.S. Pat. No. 4,512,392 (Van Ee et al.) and U.S. Pat. No. 5,273,105 (Drake). A disadvantage of these devices is low heat exchanger effectiveness. The best theoretical effectiveness is approximately 70% for a cross-flow core. Practically, these devices only achieve a fraction of that effectiveness.

Other prior art technology includes the use of a rotary heat recovery, wheel, e.g., Honeywell "Perfect Window" System energy recovery ventilator, available from Honeywell, Inc. of Golden Valley, Minnesota. This device employs a rotating regenerative wheel, as well as a fresh air filter and a room air filter. Two types of rotary heat recovery wheels may be used-a desiccant wheel to transfer moisture and also dry heat, or a sensible wheel to transfer only dry heat. (However, as is known in the art, the sensible wheel will transfer moisture when the air drops below the dew point temperature as the air passes through the regenerative wheel.) An advantage of this technology is that high heat exchanger effectiveness is possible. A disadvantage is that it requires an additional moving part, i.e., the regenerative wheel. This regenerative wheel (rotary heat recovery wheel) is approximately 16 inches in diameter for one model. It rotates at about 30 RPM. On one side of the wheel there is outside air. On the other side, there is indoor air. A brush seal is used around the rim of the wheel, and in freezing conditions, warm moist air flowing past the seal will condense and freeze forming frost. If the frost melts, it may migrate to the rim of the wheel and refreeze which can cause the wheel to freeze up. To prevent wheel freeze up, an electric preheater on the incoming air is used to warm the air to 5° F.(−15° C.).

Yet other prior art technology which uses fixed, rotating or reciprocating heat exchanging beds or some method of periodically changing the airflow direction includes U.S. Pat. No. 3,978,912 (Penney et al.); U.S. Pat. No. 4,049,404 (Johnson); U.S. Pat. No. 4,391,321 (Thunberg); U.S. Pat. No. 4,493,366 (Ekman); U.S. Pat. No. 4,589,476 (Berner); U.S. Pat. No. 4,665,805 (Ekman); U.S. Pat. No. 4,688,626 (Tengesdal); U.S. Pat. No. 4,744,409 (Berner); U.S. Pat. No. 4,754,806 (Astle); U.S. Pat. No. 4,815,522 (Thunberg); U.S. Pat. No. 4,952,283 (Besik); U.S. Pat. No. 5,002,116 (Hoagland et al.); U.S. Pat. No. 5,050,667 (Berner et al.); U.S. Pat. No. 5,375,649 (Nilsen et al.) and D. A. Reay, "Heat Recovery Systems"(E.& F.N. Spoon, London, UK, 1979, pp. 17–35).

Another problem with bringing in ventilation air concerns the quality of the fresh air introduced into the room or structure. In many places, allergens, such as, pollen or mold spores, and/or other particulates, such as, soot from vehicle exhaust or emissions from industrial sites, exist in the outside fresh air through much of the year. Thus source control of air-borne pollutants, e.g., controlling the source of the allergens and/or particulates from the incoming fresh air, is important. Filtering these allergens and/or particulates out of the incoming fresh ventilation air is important for individuals subject to respiratory diseases, including severe allergy sufferers or asthma sufferers.

Filtering of the indoor air and trapping of pollutants, particulates and/or allergens generated in the indoor air is also important, since these too can create further respiratory distress. The indoor air generated pollutants, include, but are not limited to, cigarette smoke, pipe smoke, cigar smoke, smoke from the fireplace, organic pollutants, such as gasses from building materials, e.g. particle board, plywood, rugs, paints, varnishes, adhesives, or from cleaning supplies, personal care items, room deodorants, as well as other gases, such as radon, combustion products produced by unvented cooking and heating appliances, and particulates or allergens, such as, but not limited to, animal dander, dust mites, their feces and body parts, insect body parts, indoor molds and fungus, bacteria and viruses, etc.

Air cleaning devices which remove pollutants, allergens and particulates of a certain sizes are shown in the disclosure in the American Lung Association, Washington, D.C. 20036, "Residential Air cleaning Devices: Types, Effectiveness and Health Impact, pages 9–16, 1997, the disclosure of which is hereby incorporated by reference. This publication discloses that air cleaning devices can be tabletop/console units, portable room air cleaners or central filtration units. The air cleaning devices use mechanical filters, electronic filters, hybrid filters (mechanical/electrostatic) filters, gas phase filters or ozone generators. The mechanical filter is typically a flat filter, a pleated filter, or a High Efficiency Particulate Air filter, having the acronym HEPA.

Use of a pleated filter is also known in the medical airway ventilator art for use as a heat and moisture exchanger, see, PALL™ HME BB100F, PALL BIOMEDICAL, INC., Fajaido, PR. Here a maximum 24 hour usage is recommended. The filter is alleged to have "greater than 99.999% Bacterial/Viral removal Efficiency."

The HEPA filter technology is a known technology, see U.S. Pat. No. 4,629,482 to Davis and U.S. Pat. No. 4,685,944 to Allen et al. The "A" in the acronym HEPA is alternatively referred to as air, aerosol or arrestor. Thus a HEPA filter could be referred to as a "High Efficiency Particle Air" filter, a "High Efficiency Particle Aerosol" filter or a "High Efficiency Particle Arrestor" filter. The materials used for HEPA filters are typically glass fiber, glass-asbestos fiber, or other equivalent inorganic material and may include an organic binder material. The description of the HEPA filter unit, filter properties and testing are disclosed in the publications "Underwriters Laboratories, Inc., "Test Performance of High Efficiency Particulate Air Filter Units", UL 586 (1977), pp. 5–9, International Atomic Energy Agency, Vienna(IAEA), 1970, "Air Filters for Use at Nuclear Facilities, Technical Report Series No. 122, pp. 16–42, the disclosures of which are hereby incorporated by reference. The disclosure of accordian type, V-shaped pleated HEPA filter, having closely spaced pleats and surrounded by a rectangular frame or casing on one or both edges is known. (see, IAEA Rept.122(supra), pp. 16–17, and US Army Corps of Engineers, USACERL Technical Report (TR) FE-95/10, "Air Cleaning Systems and Indoor Air Quality: A Review", pp. 69–70, 1995).

In the conventional HEPA filter art, the filter(filter unit)/filter material is typically defined by the testing standards used in the filter's certification. Interestingly, the testing standards are not identical testing methods. For example, the terms "true" HEPA and "ASHRAE" HEPA are commonly used in the HEPA filter art. The definition of each of these types of HEPA filters is governed by a different measurement standard. As used throughout herein, "true" HEPA filter and "true" HEPA filter material means a high efficiency particle air filter(filter material) which removes at least 99.97% of 0.3 micron dioctylphthalate (DOP) particles as measured by MIL-STD-282, Method 102.9.1, May 28, 1956 (Military Standard Filter Units, Protective Clothing, Gas-Mask Components and Related Products: Performance-Test Methods, U.S. Government Printing Office, Washington, D.C., pp. 33–38 and FIG. 9), the disclosure of which is hereby incorporated by reference. In the art, the particle removal referred to in MIL-STD-282 Method 102.9.1, May 28, 1956, or equivalent federal standards, is frequently shortened to "removal" or "capture" of "99.97% of all 0.3 micron particles" or "particles having a particle diameter of 0.3 microns" or "remove 99.97% of airborne particulate matter of 0.3 microns or greater", or "remove a minimum of 99.97% of the particles having a size of 0.3 microns or greater" (see, U.S. Pat. No. 4,629,482 and 4,685,944). This convention is also used herein throughout, when referring to the true HEPA filter. As used therein throughout, "ASHRAE" HEPA filter and "ASHRAE" HEPA filter material means a high efficiency particle air filter (filter material) rated at least 85% (e.g. 85% or higher) Dust-Spot Efficiency percentage as measured by ASHRAE Standard 52.1-1992, including appendix A, "Gravimetric and Dust-Spot Procedures for Testing Air-Cleaning Devices Used in General Ventilation for Removing Particulate Matter", hereinafter "Dust-Spot Procedure", American Society of Heating, Refrigerating and AirConditioning Engineers, Inc., Atlanta, Ga., (pages 1–32) the disclosure of which is hereby incorporated by reference. Since the measurement testing methods differ (e.g., "DOP test procedure of MIL-STD 282" versus "Dust-Spot Procedure" for particle removal efficiency ), it is difficult to do a direct comparison of filter efficiency of the two types of HEPA filters/filter materials. However, Table 3 of USACERL TR FE-95/10(supra), page 24, the disclosure of which is hereby incorporated by reference, shows that an approximate rating of 80% to 98% ASHRAE Dust-Spot Test (Dust-Spot Efficiency Percentage) filter generally removes 35% to 80% of 0.3 micron DOP particles.

The use of these different standards, as well as equivalent standards and/or differing standards and specifications are known in the HEPA filter manufacturing art, for example HEPA filters (filter units) commercially available from HEPA Corporation of Anaheim, Calif. meet various standards and specifications, such as, Fed. Std. 209, U.L. 900 class 1 and 2, Mil-F-51068, ASHRAE 52-76, MIL. STD. 282, U.L. 586 and IES-RP-CC-001-86.

Of particular interest is the HEPA filter unit commercially available as "3282 media" from Columbus Industries, Ashville, Ohio. This HEPA filter unit uses a HEPA grade mini-pleat material (media) made of glass micro fiber, e.g., submicron glass fibers with some synthetic fiber. This HEPA filter material captures 99.97% of all particles of 0.3 micron in diameter passing through it. The media has been tested by the manufacturer and is true HEPA up to approximately 7 feet per minute (FPM) media velocity. The traversely pleated (accordion style pleating) material is surrounded on four sides of its periphery with a chipboard frame. The V-spaced pleated sides, the top and the bottom of the filter unit are glued to a frame side, thus ensuring sealing around the frame perimeter. The frame has a frame opening on each of two opposed sides exposing the edges of the pleats. The mini-pleating is created by scoring the strip of HEPA filter material at specific size intervals, applying a glue bead separator on both sides of the strip at the location of the scoring, and accumulating the HEPA filter material, e.g., stacking the pleats into a finished accordian style. The use of the glue bead separator allows the pleating of the filter material to remain at a fixed pleat density, e.g., pleats per inch, once the glue cools and solidifies.

Where an air cleaning device is used within a room, it acts to clean the air by removing particulates, pollutants and allergens. When the air cleaning device intercepts fresh air bearing particulates, pollutants and allergens, prior to dispersal into the room, it filters the fresh air of these materials, providing source control of the particulates, pollutants and allergens. This important function prevents mixing of the particulate, pollutants and allergens introduced in the fresh air with the indoor air.

The HEPA filter is also known to be useful in the removal of radioactive or biologically hazardous materials particles from contaminated air before this air is exhausted to the atmosphere, see, U.S. Pat. No. 4,685,944, issued to Allan et. al. The HEPA filter material traps the particles in the airstream passing through the HEPA filter. The flow of air through this filter is unidirectional, thus large dust particles trapped on the HEPA filter easily impede the unidirectional air flow, causing the HEPA filter to plug up, requiring filter replacement.

Most of the present air ventilation/heat recovery technology are large, heavy, bulky devices which are expensive, difficult to install, and complex, sometimes requiring preheating incoming cold air. Whereas the, standard console HEPA air cleaning devices utilizing a HEPA filter therein, such as, the HONEYWELL HEPA/CPZ™ air cleaner and the HONEYWELL ENVIRACAIRE™ air cleaner with HEPA filters, are small portable devices, which filter only the indoor air in the room. These HONEYWELL™ console air cleaning devices are commercially available, for example, from Allergy Asthma Technology Ltd., Morton Grove, Ill. These small portable devices, likewise only have unidirectional flow, with the attendant problem of buildup of large dust particles impeding the unidirectional flow through the HEPA filter.

As, used herein this application, "HEPA" filter and/or "HEPA" filter material includes the true HEPA filter and/or true HEPA filter material (or a filter and/or filter material tested by methods equivalent to MIL-STD-282, Method 102.9.1), as well as, the ASHRAE HEPA filter and/or ASHRAE HEPA filter material (or a filter and/or filter material tested by methods equivalent to ASHRAE Standard 52.1-1992).

Typically, to provide the air cleaning, source control and ventilation at least two units/devices are needed. This becomes expensive in terms of costs of the devices and maintance of the devices. Thus what is needed is a low cost device which provides incoming ventilation air which is both HEPA filtered and HEPA conditioned by heat and moisture exchange. Not withstanding the many known practical design problems for air-to-air heat exchangers with air filtration, the art has not responded to date with the production of a compact, lighter weight, air-to-air heat recovery ventilator using a regenerative heat exchanger made of pleated HEPA filter material and not requiring any heater to heat incoming air to avoid freeze-up problems in the heat recovery ventilator, and also not requiring complex rotating seals in the regenerative heat exchanger between an indoor climate and an outdoor climate.

BRIEF SUMMARY OF THE INVENTION

The present invention provides an integrated heat recovery ventilator HEPA filter utilizing air-to-air regenerative heat exchangers made of pleated HEPA filter material and utilizing a fully rotating air switch. The heat recovery ventilator comprises four rectangular regenerative heat exchangers, two blowers, a rotating air switch all disposed in a compact rectangular housing. The regenerative heat exchangers are made of a pleated HEPA filter material. The HEPA filter (HEPA filter material) captures at least 99.97% of particles having a particle diameter of 0.3 microns. Alternatively the HEPA filter (HEPA filter material) is rated at least 85% Dust-Spot Efficiency percentage as measured by ASHRAE Standard 52.1-1992, Dust-Spot Procedure. The regenerative heat exchangers preferably have a pleat density of 6 pleats per inch. The regenerative heat exchangers are stationary with stationary seals between the outside and inside climate. One of the blowers blows a stale airstream out through the heat exchangers; the other blower blows the fresh airstream in through the heat exchangers. The rotating air switch operates in conjunction with the two blowers producing the necessary flow reversal through each regenerative heat exchanger to allow heat and moisture exchange between the stale airstream and the fresh airstream. The rotating air switch is disposed completely on the inside (indoor) climate side of the regenerative heat exchangers preventing freeze up in cold weather. The rotating air switch uses clearance seals. The system of the present invention provides a high performance, low cost, compact, lighter weight air-to-air heat recovery ventilator using a regenerative heat exchanger made of a pleated HEPA filter material and does not require any heater to heat incoming air and provides filtered incoming air as well as filtered outgoing air.

The present invention utilizes a pleated HEPA filter material as the regenerative heat exchanger and advantageously provides high quality ventilation air which is both filtered and conditioned by heat and moisture exchange.

It is an advantage of the present invention to provide a self cleaning regenerative heat exchanger, where the reciprocating airflow through the regenerative heat exchangers prevents the buildup of large dust particles in the HEPA filter material in the regenerative heat exchangers.

It is another advantage of the present invention that the air flow balance is maintained as the HEPA filter material loads with particulates, allergens and/or pollutants. The flow imbalance is also advantageously maintained as the filters load. This imbalance can positively pressurize a leaky room with the HEPA filtered air creating a clean room effect.

It is still another advantage of the present invention that the present invention is much more effective in cleaning the air in a room of external particulates, such as, pollen spores, diesel soot, etc., than using a standard console HEPA filter air cleaning device in the room. A tight room with the present invention delivering both filtered and heat and moisture exchange ventillation air is much cleaner (e.g., the indoor air in that room is cleaner), than a leaky room utilizing a standard console HEPA air cleaning device, providing filtration alone, to clean the indoor air in the leaky room. The term "tight room", herein throughout, means a room having an air leakage of less than 0.1 air exchanges per hour (ACH) into the room. The term, "leaky room", herein throughout, means a room with an air leakage of greater than 0.35 ACH or 15 cubic feet per minute (CFM) of air change per room occupant into the room. With the present invention, the room can be completely sealed from the outside, except for the ample supply of HEPA filtered and conditioned fresh air from the ventilator itself. In this instance, the indoor concentration of an external airborne particulate will be no greater than 0.03% of the outdoor level using true HEPA filters.

It is yet another advantage that the present invention is more economical to produce, purchase and maintain.

The foregoing, and other advantages of the present invention, are realized in one aspect thereof in a heat recovery ventilator for use in ventilating a room, or the like, having means for venting a stale airstream of an indoor climate to the outside air, means for supplying a fresh airstream from the outside air of an outside climate, at least two stationary regenerative heat exchangers made of pleated HEPA filter material and a rotating air switch for transferring the stale airstream to the regenerative heat exchangers from the means for venting the stale airstream of the indoor climate and for transferring the fresh airstream of the outside climate from the regenerative heat exchangers to the means for supplying a fresh airstream from the outside air of the outside climate, the rotating air switch being rotatably mounted and comprising a first circular side plate having an air flow opening therein, a second circular side plate having a pair of air flow openings with the second plate spaced apart and disposed opposed and parallel to the first side plate, and a single manifold. The manifold extends from the air flow opening in the first side plate to one of the pair of the air flow openings in the second side plate. The manifold encloses the air opening in the first side plate and one of the pair of air flow openings in the second side plate and forms a passageway for moving the fresh airstream from the regenerative heat exchangers to the means for supplying the fresh airstream from the outside air of the outside climate. The other opening in the second side plate forms a stale air passageway for transferring the stale airstream from the means for venting the stale airstream of the indoor climate to the regenerative heat exchangers, such that air flows in opposite directions through the same regenerative heat exchanger. The air switch is isolated from the outside climate by the regenerative heat exchangers. The heat recovery ventilator further comprises a plurality of noncontacting clearance seals with one of the noncontacting clearance seals disposed between the first circular plate of the rotating air switch and both the means for venting the stale airstream and the means for transferring the fresh airstream, and the remaining noncontacting clearance seals disposed between the second circular plate and the stationary regenerative heat exchangers. There are four regenerative heat exchangers. The pleated HEPA filter material has a pleat density of 6 pleats per inch. The HEPA filter material captures at least 99.97% of particles having a diameter of 0.3 microns. Alternatively, the HEPA filter material is rated at least 85% Dust-Spot Efficiency percentage as measured by ASHRAE Standard 52.1-1992, Dust-Spot Procedure.

In yet another aspect, the invention is a heat recovery ventilator for use in a room or the like, comprising a housing, two blowers, at least two stationary regenerative heat exchangers made of a pleated HEPA filter material, a shaft, a single rotating air switch, mounted on the shaft, a motor for driving the blowers and the shaft, with one of the blowers for forcing a stale airstream out of the room and the other of the blowers for forcing a fresh airstream into the room. The air switch, in use, alternately imparts the stale airstream from one blower to a regenerative heat exchanger, then imparts the fresh airstream to that same heat exchanger and through the other blower, when the air switch rotates in a 180° turn. The rotating air switch of the heat recovery ventilator air switch has a first side plate having an opening and having a center shaft aperture, a second side plate having two openings spaced from each other, and a center shaft aperture, a single manifold extending from the first side plate to the second side plate, wherein the manifold connects the opening of first side plate with one of the openings in said second side plate forming a fresh air passageway, and a shaft receiving portion extending from the first side plate to the second side plate; wherein the rotating switch is disposed upon the shaft. The shaft is disposed in the shaft receiving portion. The HEPA filter material captures at least 99.97% of particles having a diameter of 0.3 microns. Alternatively, the HEPA filter material is rated at least 85% Dust-Spot Efficiency Percentage as measured by ASHRAE Standard 52.1-1992, Dust-Spot Procedure.

In use, the fresh airstream flows from the regenerative heat exchangers through the fresh air passageway and is forced out by the other blower. The second opening of the second side plate along with a portion of the manifold and a portion of the shaft receiving portion form a stale air passageway from the one blower to the regenerative heat exchangers, for transferring the stale airstream to the regenerative heat exchangers. The housing of the aforementioned heat recovery ventilator has first compartment containing the one blower, a second compartment containing the other blower, a third compartment containing the rotating air switch, and a fourth compartment containing the regenerative heat exchangers. The first compartment has a plurality of openings therein for forcing the stale airstream to flow into the housing and through the blower. The second compartment has a plurality of openings therein for permitting the fresh airstream to exit the housing and to enter the room. The fourth compartment has a plurality of openings therein for forcing the stale airstream out of the fourth compartment and for allowing the fresh airstream to be drawn into the fourth compartment.

The first compartment is next to the second compartment and shares a common blower bulkhead. The third compartment is adjacent to both the first compartment and the second compartment and shares a common motor bulkhead with the first compartment and the second compartment. The motor bulkhead has a first opening into the first compartment and a second opening into the second compartment. The fourth compartment is spaced from the first and second compartments and is adjacent to the third compartment. The fourth compartment shares a common regenerator bulkhead with the third compartment. The regenerator bulkhead has an opening therein. The rotating air switch is disposed in the third compartment with one end of the rotating air switch adjacent the opening in the regenerator bulkhead and the other end of the rotating air switch adjacent the opening in the motor bulkhead between the second and third compartments.

In yet another aspect, the invention provides a method of providing indoor ventilation, air filtration and air pollution source control using a heat recovery ventilator having stationary rectangular regenerative heat exchangers, a manifold for accepting the regenerative heat exchangers, two blowers, one rotating air switch, a motor for driving the blower and air switch, all disposed in a housing, the housing having stale air openings for allowing a stale airstream to enter the housing and fresh air openings for allowing a filtered fresh airstream to exit from the housing. The method comprising the steps of: (a) selecting at least two stationary rectangular regenerative heat exchangers made of a pleated HEPA filter material, (b) disposing the stationary rectangular regenerative heat exchangers in the manifold, (c) forcing a stale airstream from an indoor climate into the housing, (d) blowing the stale airstream into the rotating air switch, (e) transporting the stale airstream from the rotating air switch into the stationary rectangular regenerative heat exchangers, (f) simultaneously exchanging heat and moisture from the stale airstream onto the regenerative heat exchangers, filtering the stale airstream, and forcing the filtered stale airstream to flow out of the housing, (g) forcing a fresh airstream into the housing and through the same regenerative heat exchangers, (h) exchanging heat and moisture on the regenerative heat exchanger into the fresh airstream and simultaneously filtering the fresh airstream, (i) forcing the filtered fresh airstream, which is heated and moisturized, into the rotating air switch and through the fresh air blower, and (j) forcing the filtered fresh airstream which is heated and moisturized out of the housing and into the indoor climate. The rotating air switch used in the present method includes a first side plate having an opening and having a center shaft aperture, a second side plate having two openings spaced from each other, and a center shaft aperture, a shaft receiving portion extends from the first side plate to the second side plate and connects the center shaft apertures, a single manifold extends from the first side plate to the second side plate. The manifold connects the first side plate opening with one of the openings in the second side plate and forms a fresh air passageway there between, while the other opening of the second side plate along with a portion of the manifold and a portion of the shaft receiving portion form a stale air passageway from the first blower to the regenerative heat exchanger. The method further comprises in step (d) blowing the stale airstream into the stale air passageway, in step (e) transporting the stale airstream from the stale air passageway in the rotating air switch into the stationary regenerative heat exchangers, and in step (i) forcing the filtered fresh airstream into the fresh air passageway in the rotating air switch and through the fresh air blower. The selecting step(a) includes selecting the pleated HEPA filter material wherein the HEPA filter material captures at least 99.97% of particles having a diameter of 0.3 microns. Alternatively the selecting step (a) includes selecting the pleated HEPA filter material wherein the HEPA filter material is rated at least 85% Dust-Spot Efficiency percentage as measured by ASHRAE Standard 52.1-1992, Dust-Spot Procedure.

In yet still another aspect, the present invention provides a method of providing indoor ventillation, air filtration and air pollution source control using a heat recovery ventilator having means for venting a stale airstream of an indoor climate to the outside air, means for supplying a fresh airstream from the outside air of an outside climate, and a regenerative heat exchanger. The method comprises the steps of: (a) selecting a regenerative heat exchanger of a pleated HEPA filter material, (b) positioning the regenerative heat exchanger in a stationary position to intercept a fresh air stream and to intercept a stale air stream; (c) venting the stale airstream from an indoor climate into the ventilator and into the regenerative heat exchanger with the means for venting the stale airstream of an indoor climate to the outside air; (d) simultaneously exchanging heat and moisture from the stale airstream onto the regenerative heat exchanger, filtering the stale air stream, and forcing the filtered stale airstream to flow out of the ventilator, (e) supplying fresh air into the ventilator and through the same regenerative heat exchanger with the means for supplying the fresh air stream from the outside air of an outside climate, (f) exchanging heat and moisture on the regenerative heat exchanger into the fresh airstream and simultaneously filtering the fresh airstream, and (g) forcing the fresh filtered airstream, which is heated and moisturized, out of the ventilator and into the indoor climate. The selecting step (a) includes selecting the pleated HEPA filter material wherein the HEPA filter material captures at least 99.97% of particles having a diameter of 0.3 microns. Alternatively, the selecting step (a) includes selecting the HEPA filter material, wherein the HEPA filter material is rated at least 85% Dust-Spot Efficiency percentage as measured by ASHRAE Standard 52.1-1992, Dust-Spot Procedure.

In yet a still further aspect, the present invention provides a convertible device which converts between a heat recovery ventilator providing filtered, heat and moisture conditioned air and an air filtration device providing filtered air. The convertible device comprises means for venting a stale airstream of an indoor climate to the outside air; means for supplying a fresh airstream from the outside air of an outside climate; at least two stationary regenerative heat exchangers made of a pleated HEPA filter material; and an air switch for transferring the stale airstream to the regenerative heat exchangers from the means for venting the stale airstream of the indoor climate and for transferring the fresh airstream from the regenerative heat exchangers to the means for supplying the fresh airstream from the outside air of the outside climate. The air switch is rotatably mounted; wherein, the air switch is rotated when the convertible device is operated as a heat recovery ventilator and the air switch remains stationary when the convertible device is operated as an air filtration device. The HEPA filter material captures at least 99.97% of particles having a diameter of 0.3 microns. The HEPA filter material is rated at least 85% Dust-Spot Efficiency percentage as measured by ASHRAE Standard 52.1-1992, Dust-Spot Procedure.

Other advantages and a fuller appreciation of the specific attributes of this invention will be gained upon an examination of the following drawings, detailed description of preferred embodiments, and appended claims. It is expressly understood that the drawings are for the purpose of illustration and description only, and are not intended as a definition of the limits of the invention.

BRIEF DESCRIPTION OF THE DRAWING(S)

The preferred exemplary embodiment of the present invention will hereinafter be described in conjunction with the appended drawing wherein like designations refer to like elements throughout:

Figure 1:
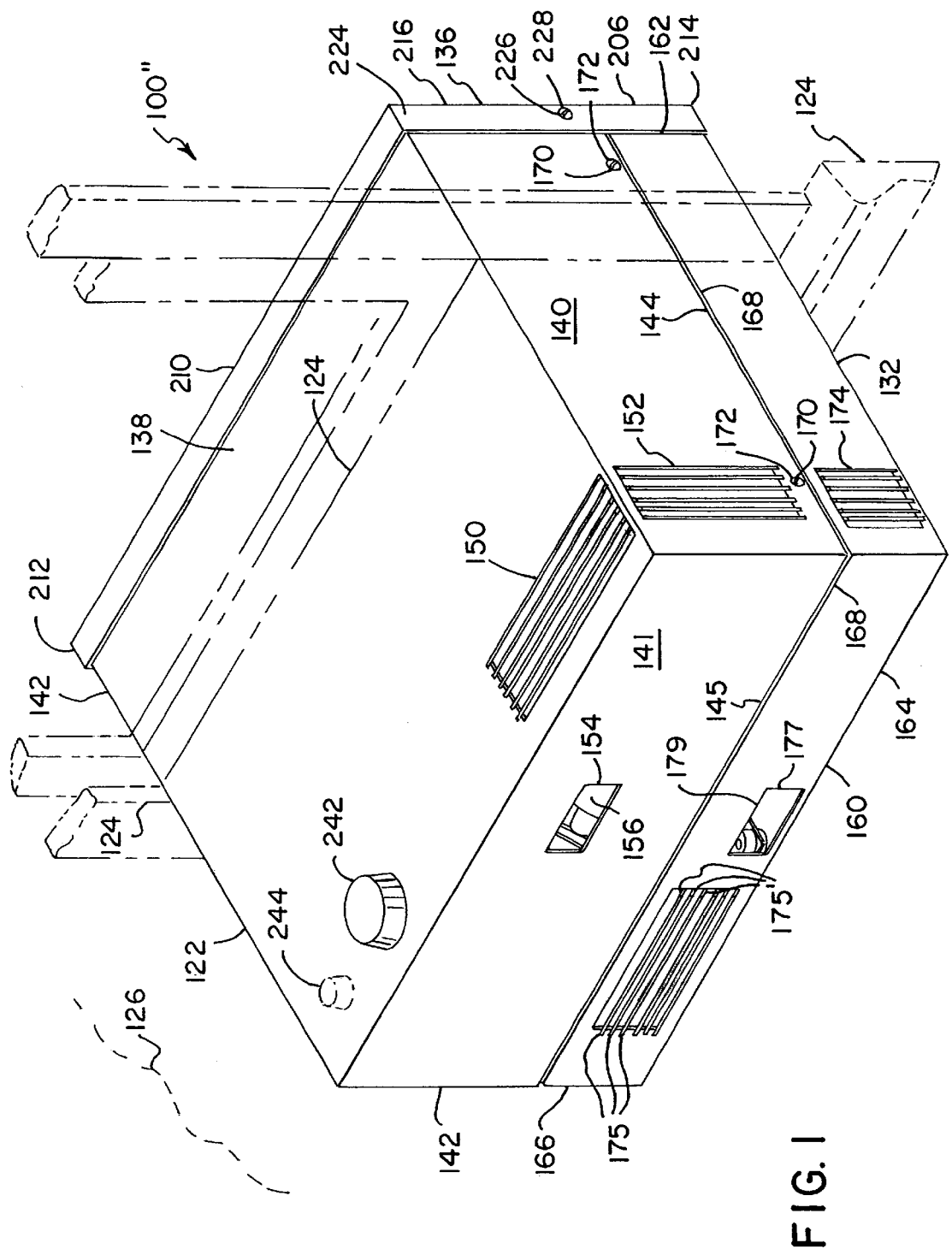
FIG. 1 is a perspective view of a first embodiment of heat recovery ventilator of the present invention, seen from within the room of the structure, and with phantom lines showing the present invention positioned in a window, opening to the outdoor climate.
Figure 5:
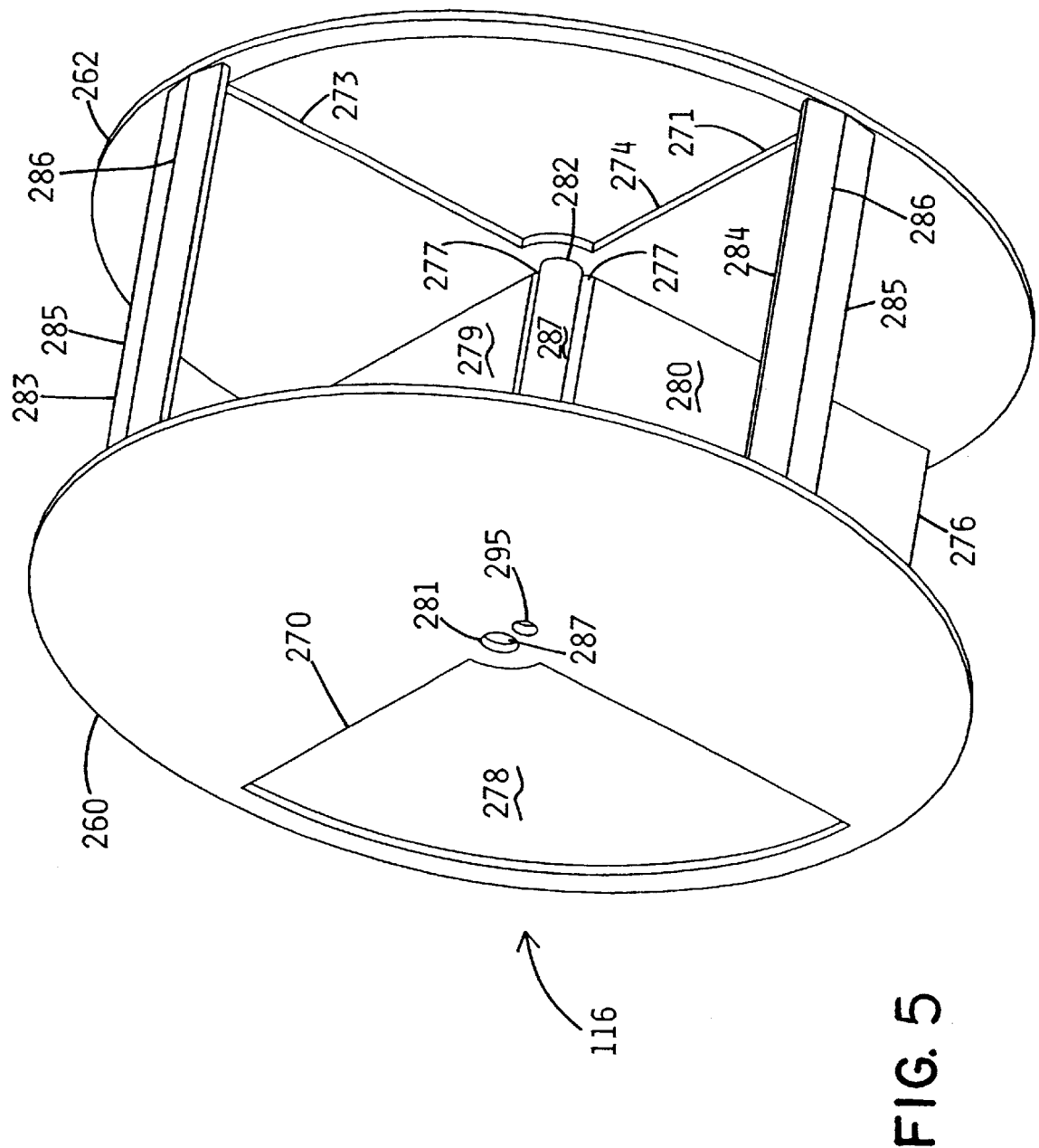
FIG. 5 is an enlarged perspective view of the rotating air switch of the present invention as seen from one side.
Figure 6:
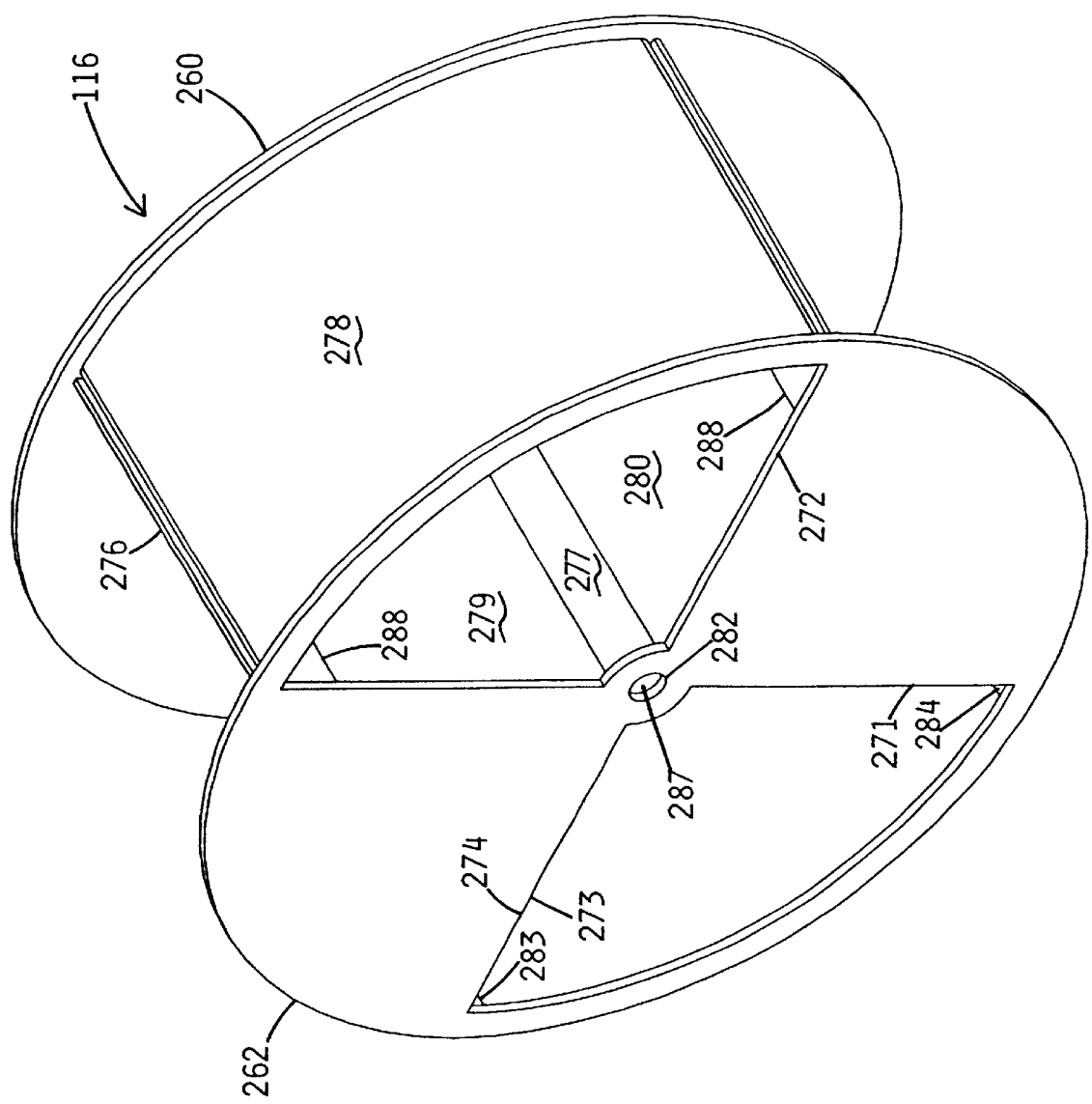
FIG. 6 is a view of the rotating air switch of FIG. 5, as seen from the other side.
Figure 8:
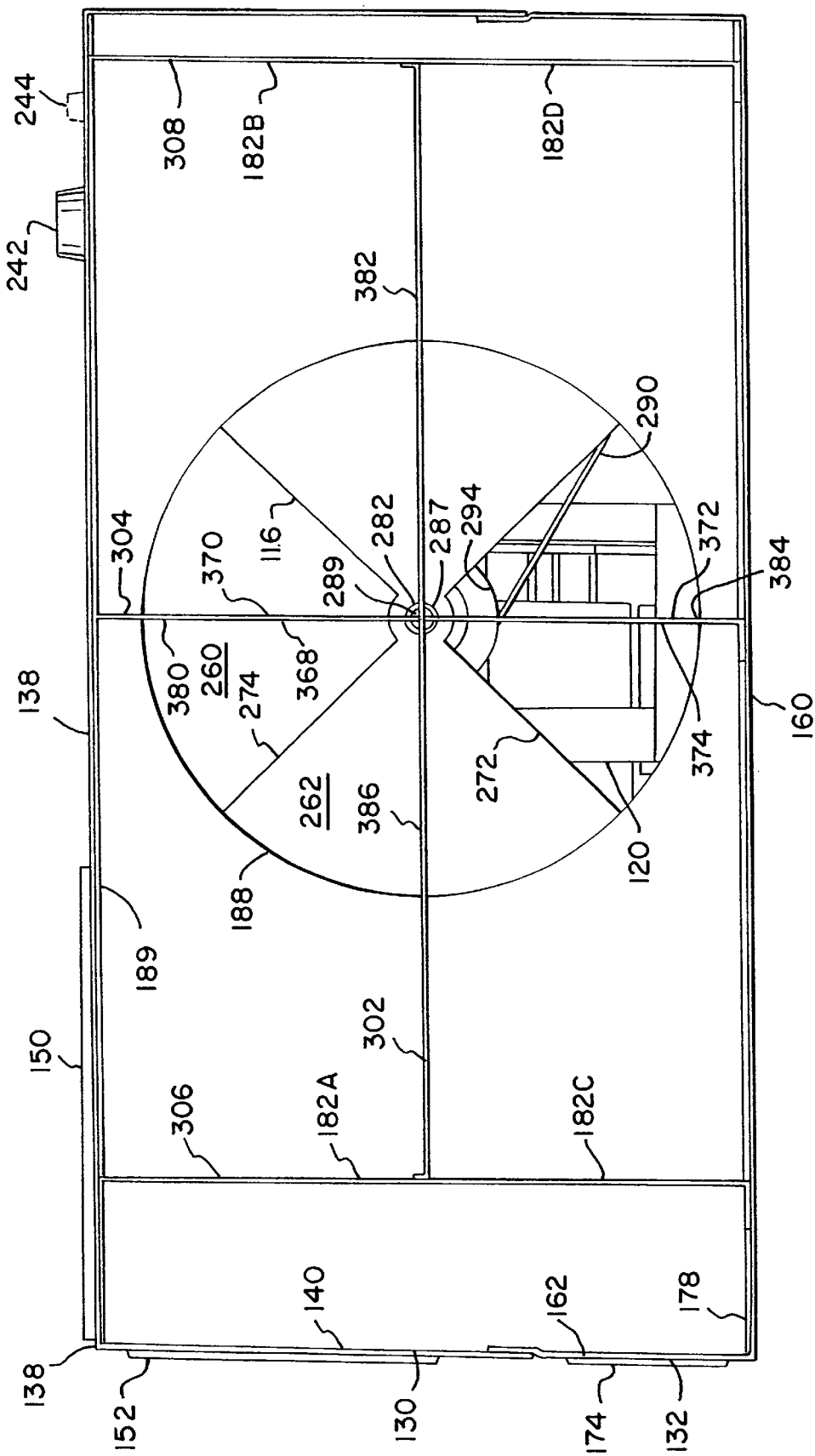
FIG. 8 is a front view of the exterior side of the present invention with the exterior cover removed and with the regenerative heat exchangers, filter stops and sealing material removed, illustrating the travel of the rotating air switch through the regenerator manifolds.
Figure 9A:
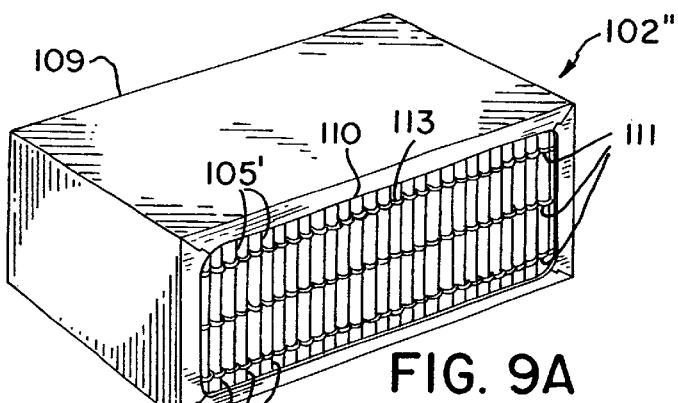
Figure 9B:
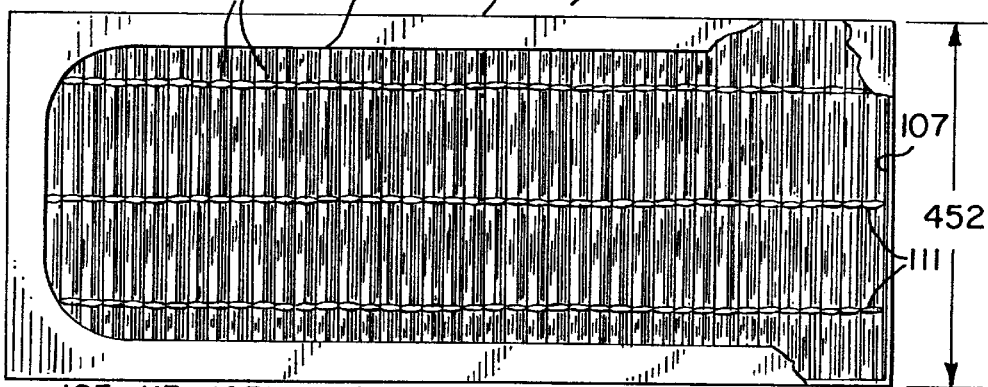
Figure 9C:
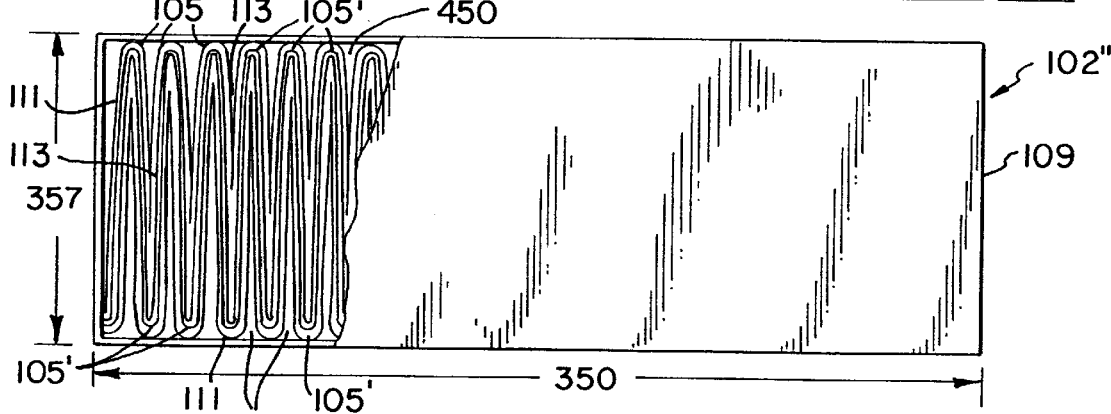
Figure 9D:
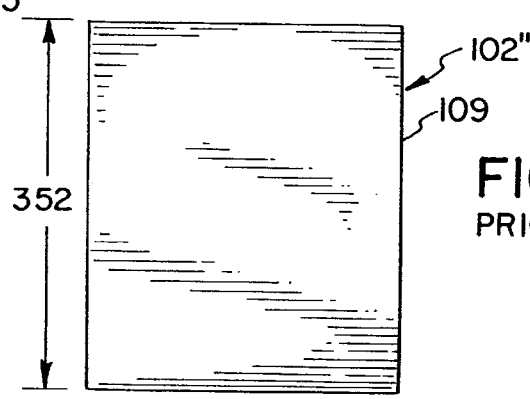
Figure 9E:
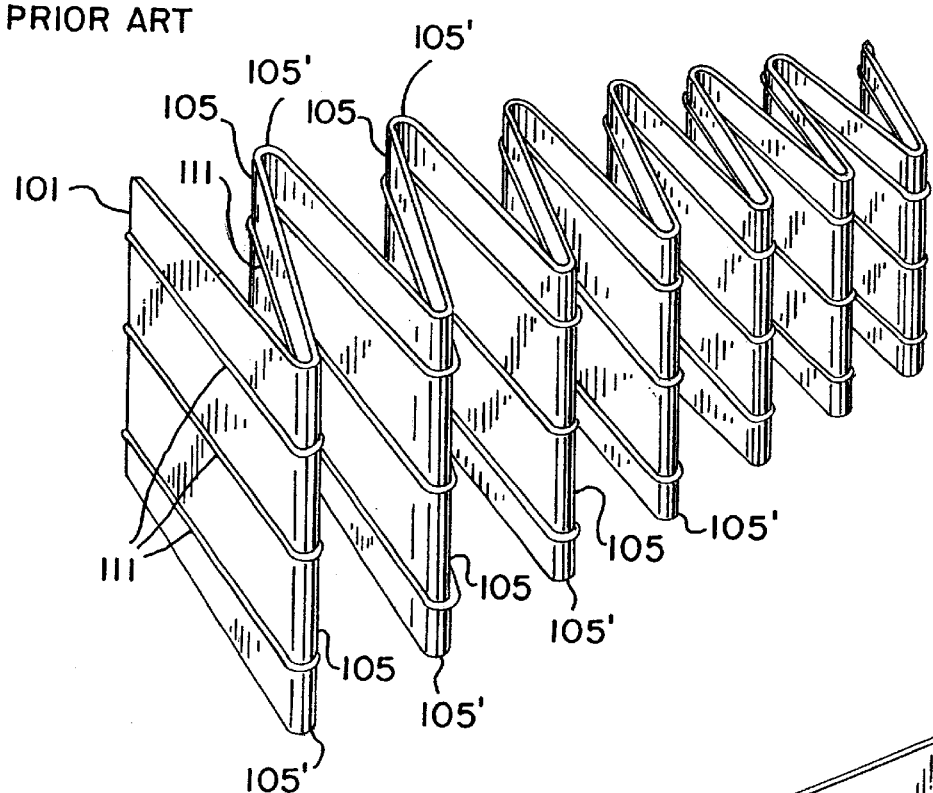
Figure 10:
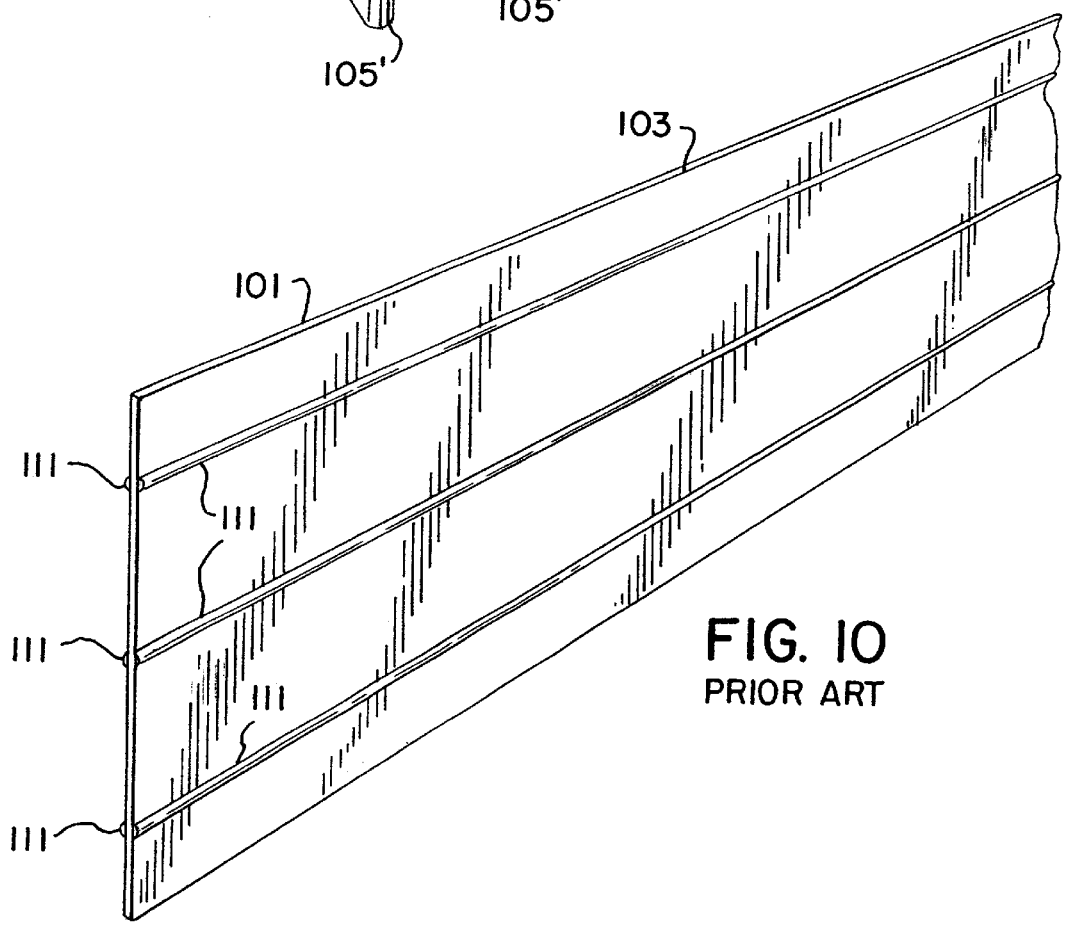
Figure 9F:
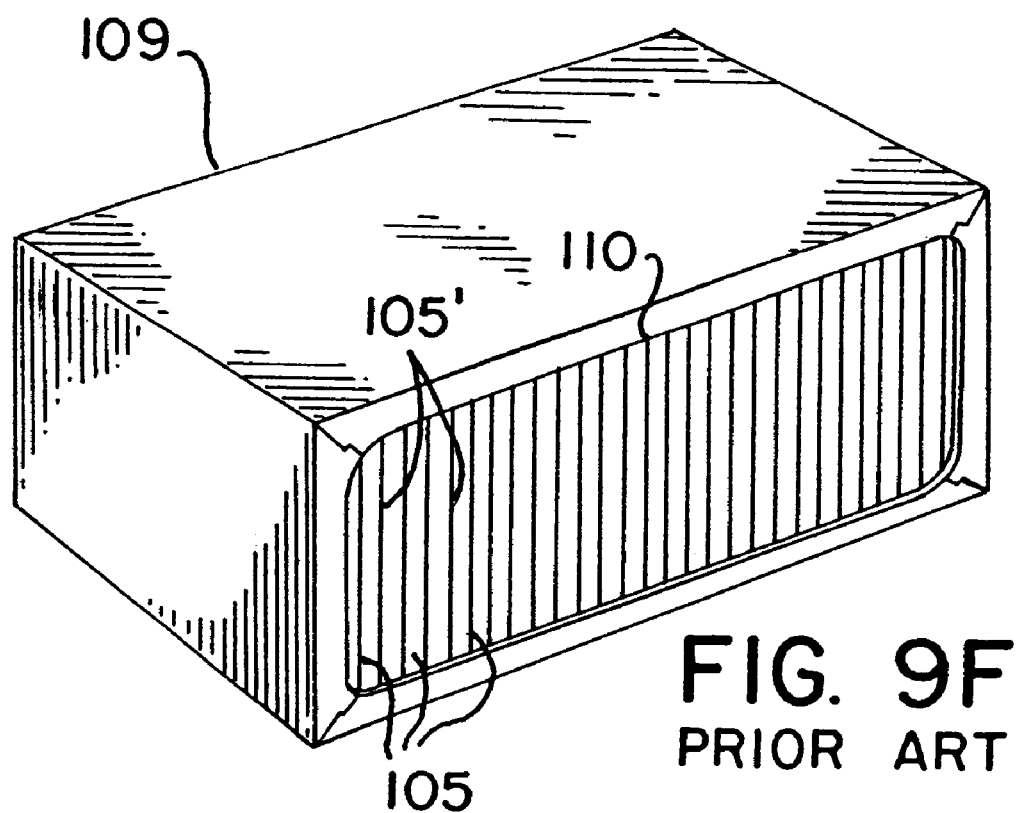
Figure 11:
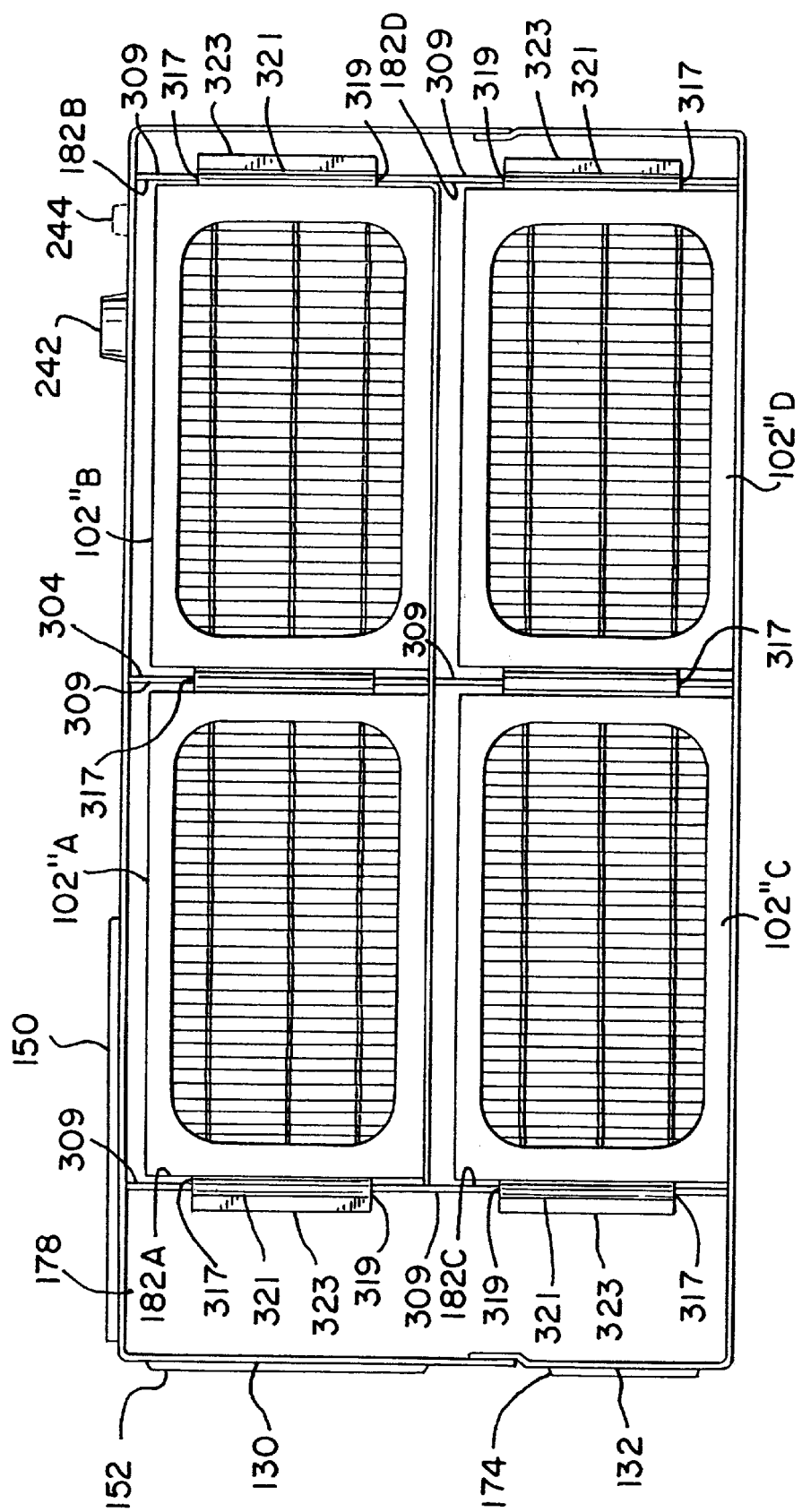
Figure 12A:
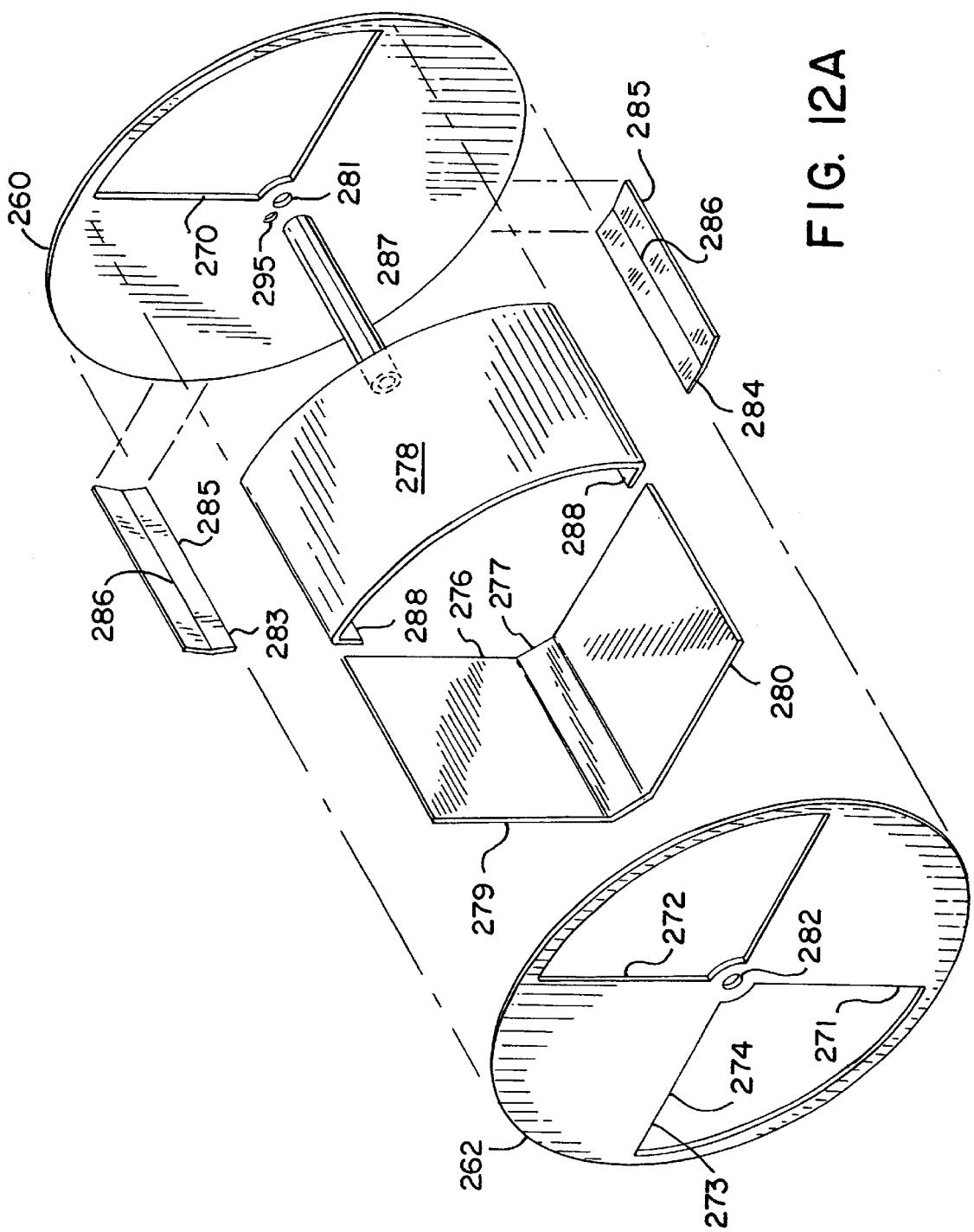
Figure 13C:
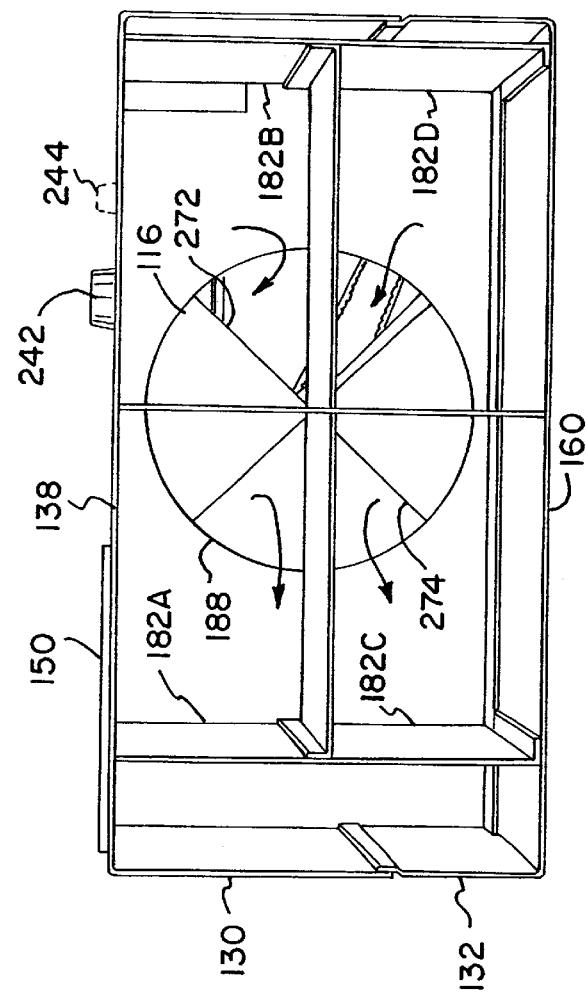
Figure 13D:
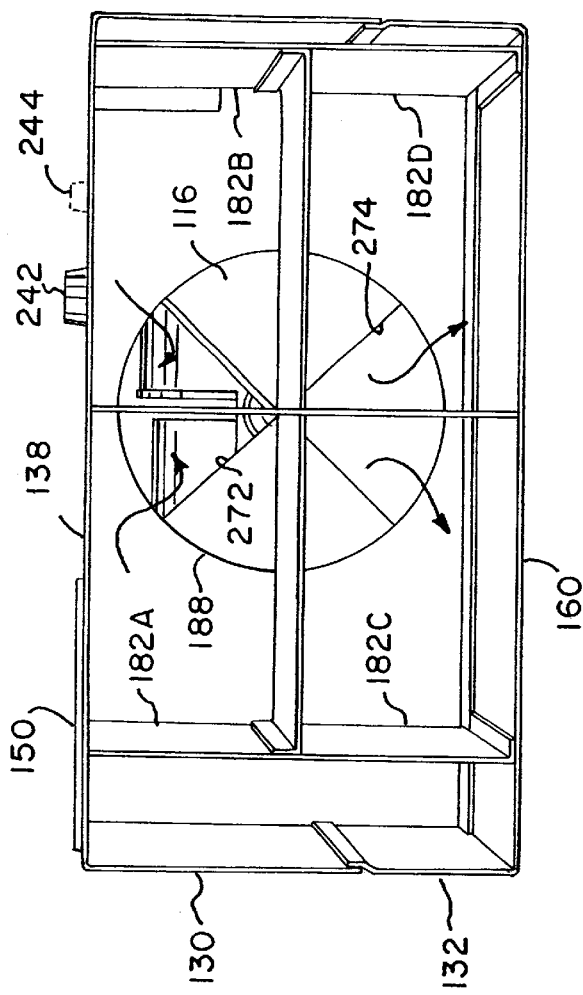
Figure 14:
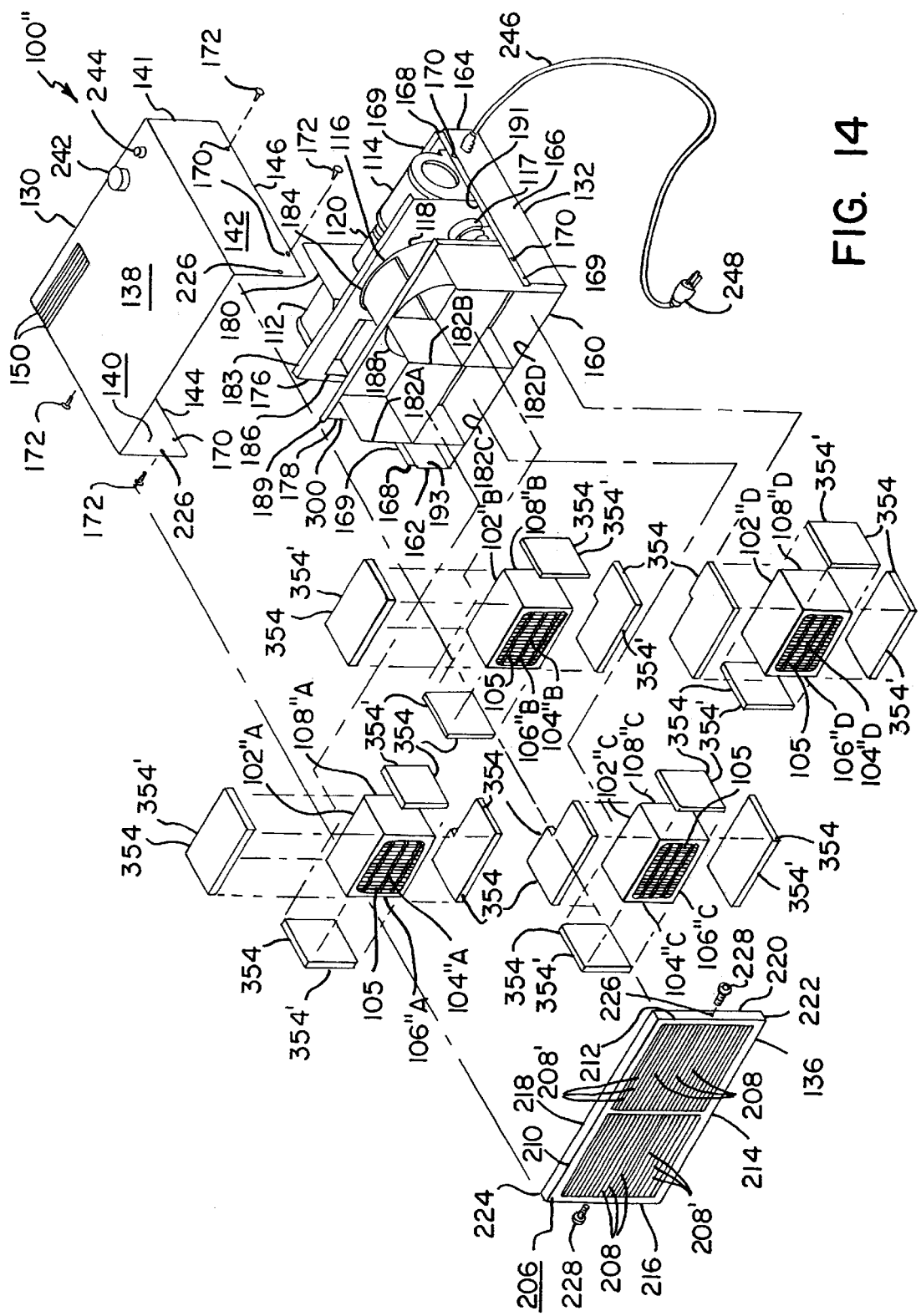

FIGS. 9A–9D are, respectively, a perspective view, a rear view with the filter frame partially broken away to show the pleating of the HEPA filter material (the front view being a mirror image thereof), a bottom plan view (the top plan view being a mirror image thereof), and right side view (the left side view being a mirror image thereof) of the most preferred prior art pleated HEPA filter material heat exchanger for use in the device of FIG. 1, the pleats are shown in partial view on the bottom plan view;

FIG. 9E is a perspective view of the preferred prior art pleated HEPA filter material without the frame around it, showing the accordian fashion pleating;

FIG. 9F is a perspective view of a prior art pleated HEPA filter material heat exchanger for use in the device of FIG. 1, the heat exchanger being made without the glue beads as shown in FIG. 9A;

FIG. 10 is a partial view of the preferred prior art HEPA filter material used in the preferred pleated HEPA regenerative heat exchanger of FIG. 9 before the HEPA filter material is pleated;

FIG. 11 is a view of the exterior side, oriented as in FIG. 8 showing the arrangement of the stationary regenerative heat exchangers and filter stops, when the exterior cover and the sealing material are removed;

FIG. 12A is an exploded enlarged view of the rotating air switch of FIG. 5;

FIG. 12B is an exploded enlarged view of the rotating air switch of FIG. 5 illustrating an alternative pie shaped manifold;

FIGS. 13A–13D are schematic perspective views for the embodiment of FIG. 1 illustrating the fresh air flow and the stale air flow through the regenerator bulkheads containing the regenerative heat exchangers as the rotating air switch travels in a 360° full rotation, beginning with the position of the rotating air switch as shown in FIG. 8, with the regenerative heat exchangers, filter stops, sealing material and the exterior cover removed; and FIG. 14 is a partially exploded view of the present invention of FIG. 1 made with a plurality of compressible seals and made without filter stops and without a gasket.

DETAILED DESCRIPTION OF THE INVENTION

The present invention relates broadly to regenerative air-to-air heat exchangers, regenerative air-to-air enthalpy exchangers, and HEPA filters. The invention is particularly well-suited for air-to-air regenerative heat exchangers utilizing high efficiency particulate air (HEPA) filter material as the regenerative heat exchanger. Applicants' copending application U.S. application Ser. No. 08/893,833 filed Jul. 11, 1997, discloses an integrated heat recovery ventilator (HRV) using regenerative heat exchangers and a separate HEPA filter assembly disposed in an interior cover. Also disclosed in that application is an integrated heat recovery ventilator utilizing regenerative heat exchangers without the separate HEPA filter assembly and without the interior cover. Applicants disclose that other regenerative heat exchangers may be used in the invention of U.S. application Ser. No. 08/893,833, Page 30, lines 6–15, which disclosure, Applicants hereby incorporate by reference.

This present application discloses a new embodiment of the HRV without the separate HEPA filter assembly in the interior cover and without the interior cover, but utilizing a pleated HEPA filter material regenerative heat exchanger. FIGS. 1–13D and FIG. 14 illustrate an integrated heat recovery ventilator (HRV) 100" of the present invention using a pleated HEPA filter material regenerative heat exchanger 102".

HRV 100" is particularly well-suited for use in small to medium sized building structures such as homes, apartments, condominiums, restaurants, taverns, small shops, and rooms thereof, etc. It is particularly well suited for home heath care applications where the individual(s) dwelling in the building structure are suffering from respiratory problems and who may be suffering from lungs diseases, asthma or allergies. The HRV 100" is also suitable for the hospital isolation ward where both the outgoing air and the incoming air must be filtered.

The general construction of HRV 100" preferably utilizes four identically dimensioned and constructed HEPA filter material regenerative heat exchangers 102", respectively 102"A, 102"B, 102"C, 102"D. The regenerative heat exchangers 102"A–102"D each have a heat exchange matrix 104"A–104"D, respectively. Each heat exchange matrix 104"A–104"D is made of a pleated HEPA filter material which is a heat exchanger material in which heat and moisture exchange occurs. HEPA filter material and the pleated HEPA filter construction is well known prior art as has been discussed in detail in the background of the invention. Although the present invention will work with any type of HEPA filter, the ASHRAE HEPA represents the lower range of the preferred quality of HEPA filters and HEPA filter materials for the present invention. The true HEPA is the most preferred HEPA filter and most preferred HEPA filter material for the present invention. As is known in the prior art, and shown in FIGS. 9A–9F and 10, a band (strip) 101 of HEPA filter material 103 is folded upon itself in accordion fashion, forming a plurality of uniform dimensioned pleats 105 to form a filter pack 107. Each pleat 105 has a pleat edge (or fold line) 105'. The filter pack 107 of pleated HEPA filter material is fastened, preferably glued into a rectangular peripheral frame 109, forming each of the HEPA filter material regenerative heat exchangers 102", which may be any one of regenerative heat exchangers 102"A–102"D.

The frame 109 can be made of cardboard, chipboard, plastic or other lightweight materials, as is known in the art. As best shown in FIGS. 9E and 10, one or more glue beads 111 (a small band of glue material) may be disposed on one side or both sides of the band 101. The band 101 is accordion pleated, folded upon itself. As the glue beads 111 solidify, they form spacers 113 between adjacent pleats 105, giving additional rigidity to the filter pack 107. Alternatively, as shown in FIG. 9F, the glue beads 111 may be omitted and the band 101 accordion pleated and glued into the rectangular peripheral frame 109 forming regenerative heat exchanger 102". In FIGS. 9A–9D, and 9F, the pleats 105 are shown in a vertical orientation; alternatively, the pleats 105 may be disposed in a horizontal orientation. The HEPA filter material of the present invention includes, but is not limited to, the true HEPA filter material, the ASRAE HEPA filter material, as well as, their equivalents. The present invention preferably uses HEPA filter (HEPA filter material) rated at least 85% Dust-Spot Efficiency percentage as measured by ASHRAE Standard 52.1-1992, Dust-Spot Procedure. The present invention most preferably utilizes a HEPA filter (HEPA filter material) which captures 99.97% of all particles of 0.3 microns in diameter which pass through it.

Figure 2:
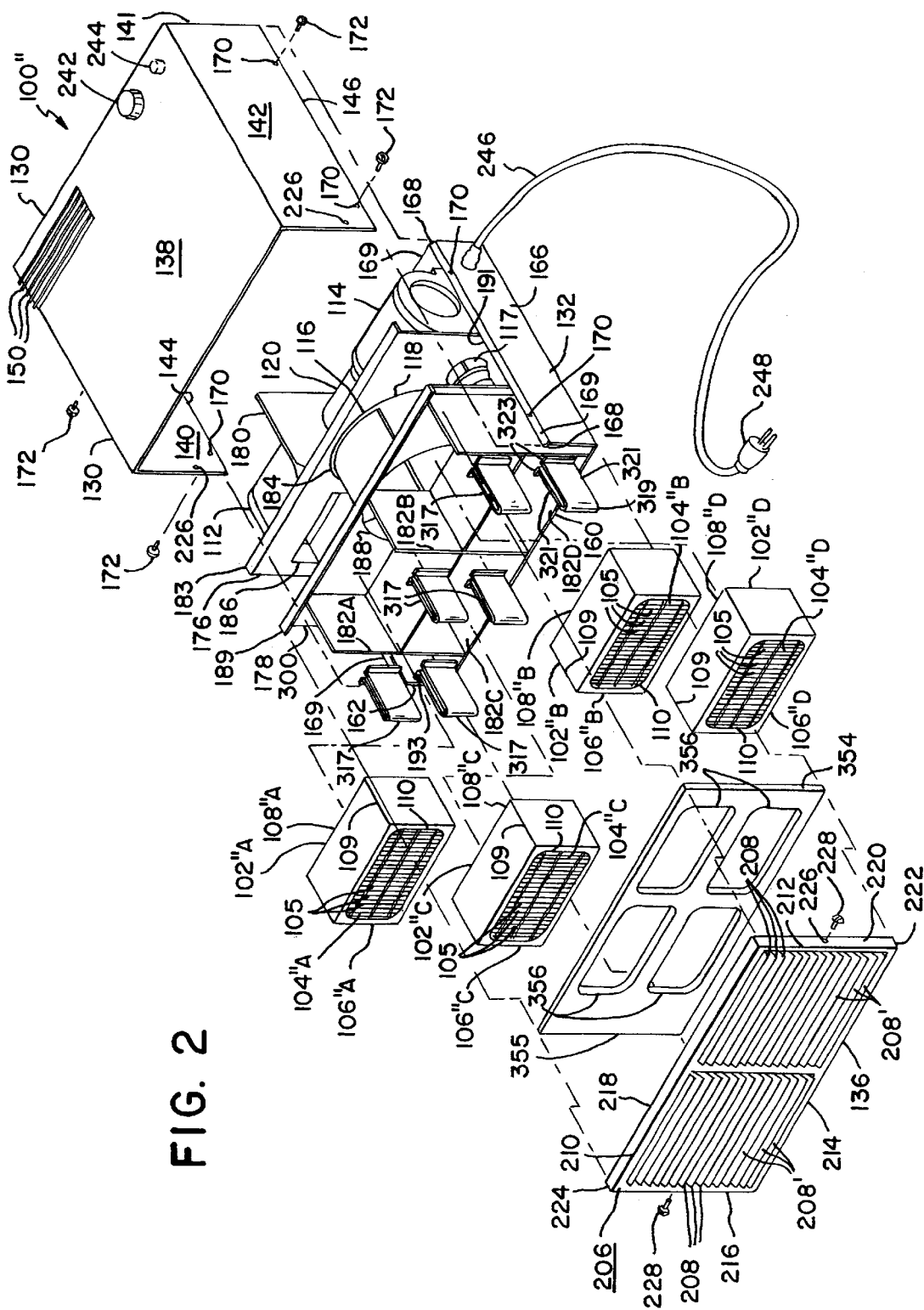
FIG. 2 is a partially exploded view of the device of FIG. 1 rotated 180°.

Referring to FIG. 2, the regenerative heat exchangers 102"A–102"D, each also have a respective outside side or face 106"A–106"D, formed by the plurality of pleat edges 105', which face the outside climate, e.g., the outside outdoor fresh air, and a respective opposite inside side or face 108"A–108"D, formed by the plurality of opposite pleat edges 105', facing the inside (indoor) climate, e.g., the indoor stale air of a room. The regenerative heat exchangers 102"A–102"D are stationary with a stationary seal(s) 354 between the outside climate side 106"A–106"D and inside climate side 108"A–108"D.

HRV 100" includes two blowers 112, 114; blower 112 blows stale air out of the structure through the regenerative heat exchangers 102"A–102"D. Blower 114 blows fresh outdoor air in through the regenerative heat exchangers 102"A–102"D. Since the regenerative heat exchangers 102"A–102"D are "regenerative", stale air flows out of any one of them for a finite period of time when the flow is reversed and fresh air flows in the opposite direction. This flow pattern is also said to be "reciprocating". In this way, heat and moisture in the stale air, which is deposited on the heat exchange matrix 104"A–104"D, is imparted to the cold dry fresh air.

Also since the material of the heat exchanger matrix 104"A–104"D is a HEPA filter material, the fresh air bearing allergens, particulates and pollutants is filtered through the regenerative heat exchangers 102"A–102"D, bringing fresh filtered air into the HRV 100" and discharging filtered stale air out of the HRV 100". This is especially useful in the hospital isolation ward where both the outgoing stale air and the incoming fresh air must be filtered. It is also very beneficial in home health care applications for individuals suffering from respiratory illnesses, asthma or allergies. Thus source control, as well as ventilation, are advantageously achieved without the need for a separate HEPA filter on the HRV as disclosed in applicants' application Ser. No. 08/893,833 or for a standard console HEPA filter air cleaning device. As the stale air flows through the HEPA filter material in the regenerative heat exchanger 102"A–102"D certain indoor pollutants, allergens and particulates are trapped in the filter, thereby cleaning the indoor air. The filter loads with very small particles. It is believed that the fine dust particles and other very small particles are captured by the HEPA filter material and held onto it by van der Waal forces.

Also the reciprocating flow provides self cleaning action of the regenerative heat exchanger 102"A–102"D. The reciprocating flow prevents build up of large dust particles, which typically impede airflow in a standard unidirectional air flow device, such as a standard console HEPA air cleaning device. In unidirectional air flow devices, it is not uncommon for users of the devices to extend the life of the HEPA filter by vacuuming the larger dust particles off the HEPA filter. Alternatively, some devices have a pre-filter element fabricated of a less expensive material than HEPA filter material. The pre-filter element is used to trap these larger dust particles, before the air is conducted into the HEPA filter. Advantageously, the reciprocating flow allows the HEPA filter material regenerative heat exchangers 102"A–102"D to last longer because the HEPA filter material is not being loaded with the larger particles. This advantage means no pre-filter is needed, as is sometimes needed on standard console HEPA air cleaning devices and that less maintenance is required to keep the HRV 100" operational over an extended period of time.

Thus the present invention is more economical to build (manufacture), purchase and operate. This is because separate HEPA filters (or other air cleaning devices) to post-clean the ventilation air of pollen, mold spores, etc., in addition to the regenerative heat exchangers are not required, and because the HEPA filter material regenerative heat exchangers 102"A–102"D of the present invention last longer because they do not plug up (load) as easily with large a dust particles because of the reciprocating flow.

In addition, air flow balance is advantageously maintained between the fresh air stream and the stale air stream as the HEPA filter material regenerative heat exchangers 102"A–102"D of the present invention load. This maintance of air flow balance occurs because resistance to the air flow should be independent of air flow direction, as the HEPA filter material of the regenerative heat exchangers 102"A–102"D load with particles.

Air flow imbalance is also maintained as the HEPA material regenerative heat exchangers 102"A–102"D of the present invention load. Air flow imbalance is caused by one of the two aforementioned airstreams. having a larger flow resistance, or one of the two blowers 112, 114 having a larger air flow output in CFM. This imbalance can positively pressurize a leaky room with the HEPA filtered air for a clean-room effect. The imbalance is created by partially blocking openings in the HRV 100" through which stale air enters into the HRV 100". The entrance of stale air into the HRV 100" will be described later, when the operation of the HRV 100" is explained.

A separate rotating air switch 116 operating in conjunction with blowers 112, 114, produces the necessary air flow reversal; thus, blower 112 is a stale air blower and blower 114 is a fresh air blower. A conventional commercially available gear motor 117 drives the rotating air switch 116. The gear motor 117 is an assembly combining both a conventional electric motor (not shown) and a gear box (not shown). The rotating air switch 116 is located completely on the inside (indoor) climate side 108"A–108"D of the regenerative heat exchangers 102"A–102"D and thus isolated from the outside climate. Advantageously, this unique location of the rotating air switch 116, plus the use of regenerative heat exchangers 102"A–102"D in the HRV 100" prevents the possibility of freeze-up of the rotating air switch 116 in cold weather. Also, the rotating air switch 116 preferably uses noncontacting clearance seals 118, 119, thus there is no wear problem. A conventional electric motor 120 is used to operate the blowers 112, 114 of the HRV 100". Suitable conventional electrical components 121 are used to convey electrical power to the device. A compact rectangular cover or housing 122 encloses the rectangular regenerative heat exchangers 102"A–102"D, the stationary seal(s) 354, the stale air blower 112, the fresh air blower 114, the rotating air switch 116, the gear motor 117, the clearance seals 118, 119, and the electrical motor 120.

Reference is now made specifically to FIG. 1, wherein the integrated heat recovery ventilator 100" is shown mounted in a window opening 124 in a room of a structure 126. The window opening 124 and room of structure 126 are illustrated in phantom lines. FIG. 1 shows HRV 100" of the present invention as viewed from the interior of the room in which the invention is used. As used herein, "interior" refers to that side of the HRV 100" which typically faces the interior (indoor side) of the structure being ventilated, and outside or "exterior" refers to that side of the HRV 100" which typically faces the outside of the structure 126 being ventilated (outdoor climate). HRV 100" may be mounted in a window 124 or through an opening in an exterior wall (not shown) of a room of a structure 126.

Also the HRV 100" may be removed from the window 124, and placed in the room of the structure 126 and used as a standard console HEPA filter air cleaning device as will be explained later.

As best shown in FIGS. 1 and 2, the rectangular housing 122 of HRV 100" has three housing portions: an upper casing 130, a lower casing 132, and an "exterior" cover 136 which are fastened together.

Upper casing 130 has a generally rectangular top wall 138 and three downwardly depending side walls 140, 141, 142, respectively. Side walls 140, 141, 142 terminate in side wall edges 144, 145, 146 respectively. Side walls 140, 142 are disposed as an opposed pair, with side wall 141 extending between side walls 140, 142 and generally perpendicular to them. Top openings 150 are disposed on the top wall 138 of the upper casing 130. Side openings 152 are disposed on the side wall 140 near the top openings 150. An upper casing window 154 is disposed in side wall 141. Window 154 is sealed with a clear plastic piece 156.

Figure 3:
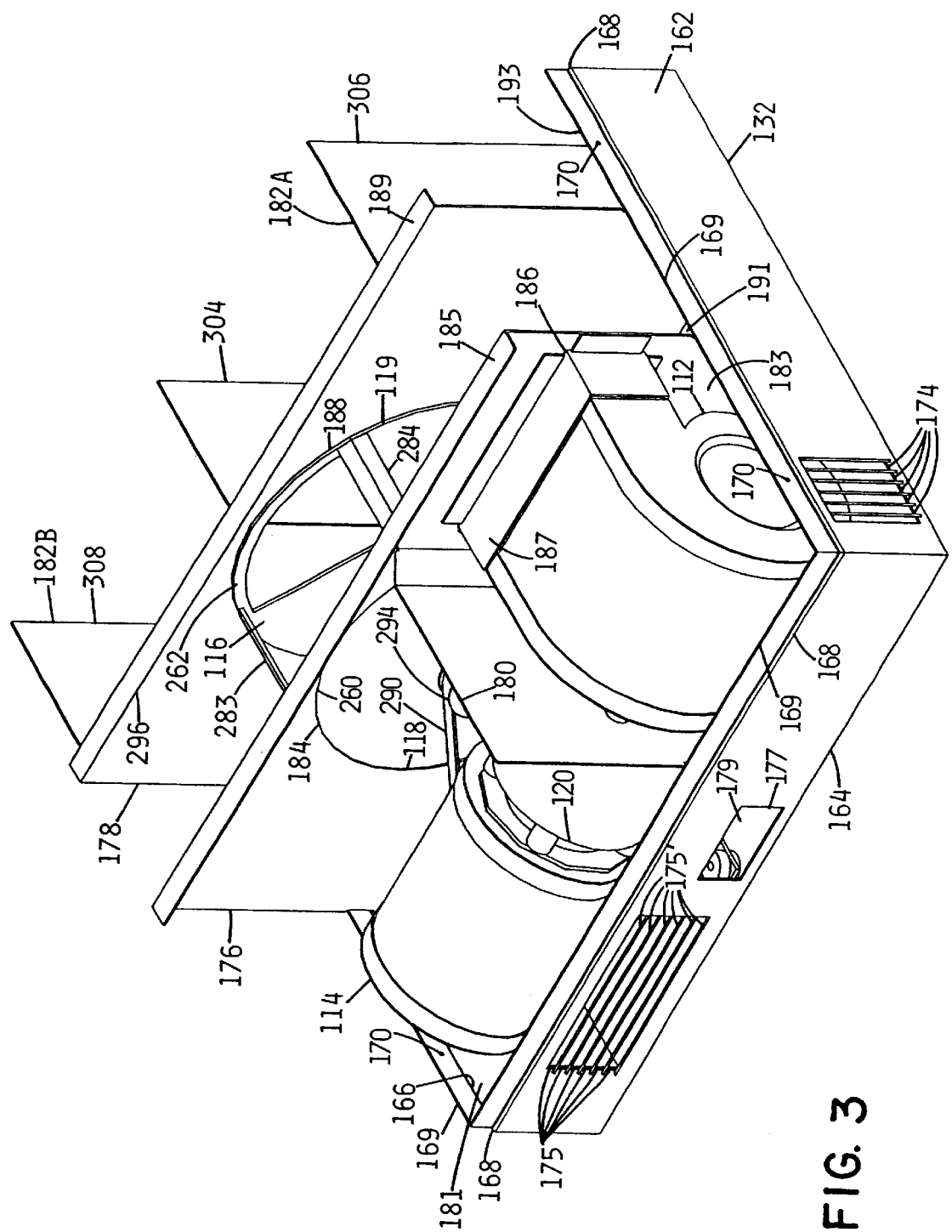
FIG. 3 is an enlarged perspective view of the lower casing and assembled compartments of FIG. 2 from the opposite direction with the regenerative heat exchangers and filter stops removed from the regenerator manifolds.
Figure 4:
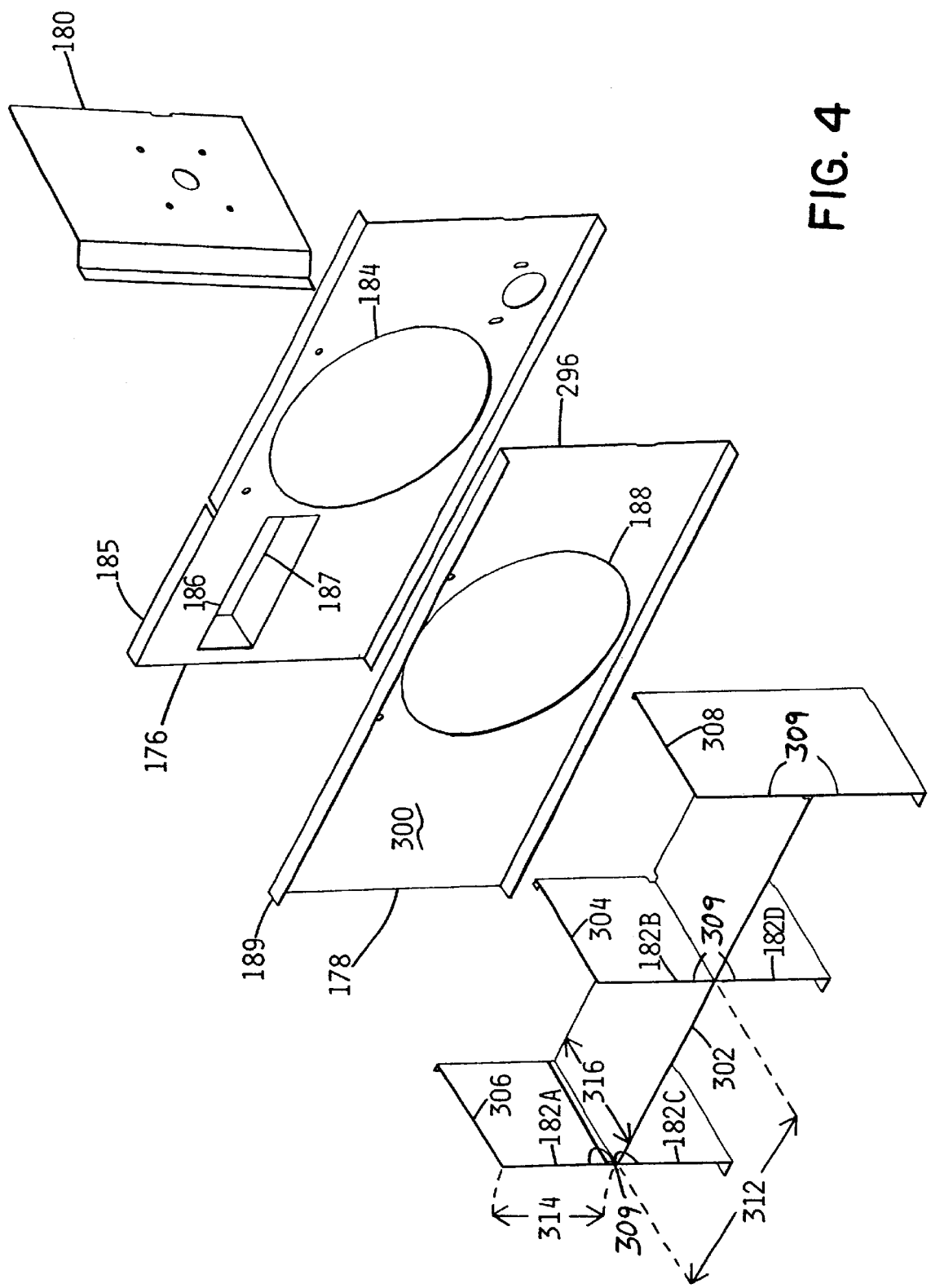
FIG. 4 is an exploded enlarged perspective view of the bulkhead of the present invention.

The lower casing 132 has a bottom wall 160 and three side walls 162, 164, 166 extending upwardly from the bottom wall 160. The side walls 162, 164, 166 form a ledge 168. A lip 169 extends upwardly from the ledge 168. Side walls 162, 166 are disposed as an opposed pair with side wall 164 extending between them and generally perpendicular to them. Side walls 162, 164, 166 are dimensioned to permit the side wall edges 144, 145, 146 of the upper casing 130 to rest on the ledge 168 above each and abut against lip 169. Openings 170 are suitably arranged on the side walls 140, 142, 162, 166 and on lip 169 above side walls 162, 166 to allow the attachment of the upper casing 130 to the lower casing 132 using conventional fasteners 172, such as hardware screws. As is best shown in FIG. 3, side openings 174 are disposed in the side wall 162. The mounting of the HRV 100" in an opening or the window 124 in the room of the structure 126 must allow the side openings 152, 174 and top openings 150 to be physically inside the structure 126. Preferably openings 150, 152, 174, are louvered, however other suitable openings such as elongated or slotted openings, or grill type openings may be used as is known by those skilled in the art.

Openings 175 are disposed in side wall 164 near side wall 166. Proximate openings 175 is a lower casing window 177 which is sealed with a clear plastic piece 179. The window 154 is disposed directly above the window 177 when the upper casing 130 is attached to the lower casing 132. Preferably openings 175 are louvered openings with a louver 175' directed upwardly to channel air toward the ceiling of a room in which the device HRV 100" is used. When the device HRV 100" is operated without an automatic frost protection or a defrost cycle, one may check for any frost or dirt build-up occurring on the regenerative heat exchangers 102"A–102"D by viewing them through windows 154 and 177. The windows 154 and 177 also allow the occupant of the room to verify that the HRV 100" is working properly.

The lower casing 132 contains the stale air blower 112, the fresh air blower 114, the motor 120 for controlling blowers 112, 114, the rotating air switch 116, the gear motor 117, conventional electronics for driving the gear motor (not shown), miscellaneous wiring for the motors 120, 117, blowers 112, 114, and air switch 116, a motor bulkhead 176, a regenerator bulkhead 178, a blower bulkhead 180, a plurality of regenerator manifolds 182A–182D and an equal number of regenerative heat exchangers 102"A–102"D.

As shown in FIG. 3, the lower casing 132 is divided into four large compartment sections. A first section 181 and a second section 183 are created by the arrangement of the blower bulkhead 180 and the motor bulkhead 176. The blower bulkhead 180 is disposed between the fresh air blower 114 and the stale air blower 112 and serves to isolate each blower from the other. The motor 120 and means for driving the gear motor 117 are suitably adjacent to the fresh air blower 114 and on the same side of the blower bulkhead 180 as the fresh air blower 114. The motor bulkhead 176 is disposed generally parallel to side wall 164 and in contact with blower bulkhead 180. Thus, the first compartment section 181 contains the fresh air blower 114, motor 120, and means for driving the gear motor, and the second section 183 contains the stale air blower 112. The motor bulkhead 176 has a large circular opening 184 adjacent to and almost abutting a side plate 260 of the rotating switch 116 and a separate stale air opening 186 for communicating with the stale air blower 112. The circular opening 184 is disposed to communicate with the fresh air blower 114. A baffle 187 sealingly connects stale air blower 112 to stale air opening 186 in the motor bulkhead 176. Circular opening 184 is preferably smaller in diameter than diameter of side plate 260.

The regenerator bulkhead 178 is spaced from the motor bulkhead 176 and is oriented generally parallel to it forming a third compartment section 191. The third compartment section 191 is sufficiently dimensioned to permit the interposition of the rotating air switch 116 between motor bulkhead 176 and the regenerator bulkhead 178. The regenerator bulkhead 178 has a large circular opening 188 adjacent to and almost abutting an opposite side plate 262 of the rotating air switch 116. Circular opening 188 is preferably smaller in diameter than diameter of side plate 262. Circular openings 184 and 188 and side plates 260 and 262 are preferably concentric. The gear motor 117 for driving the rotating air switch 116 is also disposed in the third section 191.

A fourth compartment section 193 defines the space occupied by the regenerator manifolds 182A–182D on the side of the regenerator bulkhead 178 opposite the rotary air switch 116. The interrelation of these elements of the HRV 100", will be discussed after the discussion of the exterior cover 136.

The motor bulkhead 176, the regenerator bulkhead 178, and the blower bulkhead 180 are suitably dimensioned to contact the top wall 138 when the upper casing 130 is fastened to the lower casing 132. Preferably, the motor bulkhead 176 and the regenerator bulkhead 178 each have flanges 185, 189, respectively, which abut the top wall 138 when the upper casing 130 and lower casing 132 are fastened.

The final part of the housing 122 of HRV 100" is the exterior cover 136, as best shown in FIG. 2. The exterior cover 136 has a generally rectangular surface 206 having a plurality of openings 208 for air flow therein. Preferably openings 208 are louvered having a downwardly directed louver 208' to prevent rain and snow from entering the exterior cover 136. The exterior cover surface 206 has four edges 210, 212, 214, 216. Generally rectangular sides 218, 220, 222, 224 extend from the edges. Preferably the stationary seal 354 is a compressible sealing material 355, having a plurality of openings 356 therein, which is inserted in the exterior cover 136. The exterior cover 136 is suitably dimensioned to fit over the adjoined upper casing 130 and lower casing 132. The sides 220 and 224 of the exterior cover and the side walls 140 and 142 of the upper casing 130 each have suitable openings 226 to permit openings 226 to align when the HRV 100" is assembled. Suitable fasteners 228 may be threaded through the openings 226 to fasten the exterior cover 136 to the joined upper casing 130 and lower casing 132. These fasteners 228, include but are not limited to, hardware screws.

As best shown in FIGS. 1–3 and 7, when the three portions of the housing 122 for HRV 100" are fully assembled, the housing forms four compartments. A first compartment 230 is formed by upper casing top wall 138, upper casing side wall 140, upper casing side wall 141, lower casing bottom wall 160, lower casing upwardly side walls 162, 164, motor bulkhead 176, and blower bulkhead 180. The first compartment 230 contains the stale air blower 112. The openings 150, 152, and 174 provide for stale air to flow into this compartment. By partially blocking one or more of openings 150, 152, and/or 174 of HRV 100", one can create air flow imbalance between the fresh air stream and the stale air stream which can positively pressurize a leaky room to achieve a clean room effect. A clean room effect herein throughout means a room in which all the air entering the room passes through a HEPA filter.

A second compartment 232 is formed by the upper casing top wall 138, upper casing side walls 141 and 142, blower bulkhead 180, motor bulkhead 176, lower casing side walls 166, 164, and lower casing bottom wall 160. This second compartment 232 contains the fresh air blower 114, motor 120, and means for driving the air switch 116 with the gear motor 117. The openings 175 inside wall 164 provide fresh filtered air flow out of this compartment. Covered windows 154 and 177 are located in this compartment.

A third compartment 234 is formed by the upper casing top wall 138, upper casing side walls 140, 142, lower casing bottom wall 160, lower casing side walls 162, 166, motor bulkhead 176, and regenerator bulkhead 178. This third compartment 234 contains the rotating air switch 116 and the gear motor 117.

A fourth compartment 236 is formed by regenerator bulkhead 178, upper casing top wall 138, upper casing side walls 140, 142, lower casing bottom wall 160, lower casing side walls 162, 166, and exterior cover 136. The forth compartment contains the regenerator manifolds 182A–182D and the regenerative heat exchangers 102"A–102"D and the sealing material 354. The openings 208 in exterior cover 136 and the openings 356 in the seal material 354 permit fresh air flow into the regenerative heat exchangers 102"A–102"D and stale air to flow out of the regenerative heat exchangers 102"A–102"D.

The air flow is generally balanced as the regenerative heat exchangers 102"A–102"D load with pollutants, allergens and particulates.

As is known in the art, conventional electrical switches and wiring (not shown) are used in the HRV 100". The HRV 100" has a continuously variable blower (high speed/low speed) switch 242 which also serves as an on-off switch for both the blower motor 120 and the gear motor 117, which drives the rotating air switch 116. Hereinafter the switch 242 is also referred to as the on-off switch 242. Another switch, a gear motor switch 244, with its associated conventional wiring (not shown) is optional and is used to just turn off and on the gear motor 117. When the gear motor switch 244 is present on the device, the HRV 100" may be operated as a convertible device, permitting the HRV 100" to be operated as a standard HEPA filter air filtration device, or as standard console HEPA air filtration device to filter indoor room air. The presence of the gear motor switch 244 enables one to use the HRV 100" as a convertible device. The use of the optional gear motor switch 244 will be explained subsequently and in respect to Examples 2 & 3.

A conventional electrical cord 246 with a plug 248 provides electricity to operate the motors 117, 120 in the HRV 100" when the HRV 100" is energized with electricity. Automatic defrost can be added to the HRV 100" by placing a thermometer (not shown) to sense outside temperature. When the outside temperature gets low enough, appropriate conventional electronics can be used to turn the gear motor 117 on and off continuously, such that the rotating air switch 116 rotates half a turn (e.g., 180°); stops for a period of time; rotates half a turn in the same direction, (e.g., 180°); stops; etc. This reduces the effectiveness of the heat exchange which, in turn, reduces the temperature at which frost sets in. As outside temperature decreases, the period of time, during which the gear motor 117 stops, can be increased.

The present invention is operated in the following way. The electrical cord is plugged into a conventional electrical outlet. The on-off switch 242 is activated. This activates the motor 120. Gear motor 117 is also activated at this time. Stale air enters the HRV 100" through the side openings 152, 174 and top openings 150 of the housing 122 and is drawn into the first compartment 230 by the stale air blower 112. Thus, the stale air from the indoor climate of the structure 126 is forced into the housing 122 and forms a stale airstream.

The fresh air blower 114 and the stale air blower 112 are driven by the single motor 120. The stale air blower 112 blows the stale air through the opening 186 in the motor bulkhead 176 into the third compartment 234, e.g., the space between the motor bulkhead 176 and the regenerator bulkhead 178. The stale airstream flows into the rotating air switch 116. The rotating air switch 116 transports the stale airstream from the third compartment 234 into the stationary regenerative heat exchangers 102"A–102"D in the fourth compartment 236.

The rotating air switch 116, as best shown in FIGS. 5, 6, 12A and 12B is comprised of two circular side plates and a manifold extending there between. The two circular side plates are a motor side plate 260 and a regenerator side plate 262. Preferably, the motor side plate 260 and the regenerator side plate 262 are identical in circular dimension and spaced parallel to each other. In the preferred embodiment, the motor side plate 260 is dimensioned to be larger than the circular opening 184 in the motor bulkhead 176. Likewise, the regenerator side plate 262 is dimensioned to be larger than the circular opening 188 in the regenerator bulkhead 178. The motor side plate 260 and the regenerator side plate 262 are approximately 8% larger in diameter than the corresponding circular opening 184, 188 in the respective bulkheads 176, 178. (In the preferred embodiment, the motor side plate 260 and the regenerator side plate 262 each have outer diameters of about 7 inches; where as, the circular openings 184, 188 in the respective bulkheads, each have diameters of about 6.5 inches.) The bulkhead circular openings 184, 188 are preferably concentric. The side plates 260, 262 are preferably concentric with each other and with the bulkhead circular openings 184, 188. The clearance seals 118, 119 are preferably "noncontacting" clearance seals, e.g., air gaps. The clearance seal 118 is a small air gap between the motor side plate 260 and the bulkhead 176. The clearance seal 119 is a small air gap between the regenerator side plate 262 and the bulkhead 178. Thus, the bulkheads 176, 178 and respective side plates 260, 262 are not in contact. In the preferred embodiment, the clearance seals 118, 119 are face seals, not rim seals. By the term "face" seals it is meant that the air gaps are between the bulkheads and the respective side plates of the rotating air switch 116. In the preferred embodiment, the bulkheads 176, 178 are in place in the housing 122 and the rotating air switch 116 is slipped between the bulkheads 176, 178. Side plate 260 is adjacent to and in almost abutting relationship with bulkhead 176. The clearance seals 118, 119 are air gaps of approximately 0.015 inches and prevent full contact of the side plates 260, 262 with the respective bulkheads 176, 178. Side plate 262 is adjacent to and in almost abutting relationship with bulkhead 178.

The rotating air switch 116, may be mounted in the HRV 100" in an alternate manner as may be appreciated by those skilled in the art. In this alternative mounting schema all other aspects of the HRV 100" are identical, except as described subsequently. In this alternative mounting schema, the motor side plate 260 is dimensioned to fit within the circular opening 184 in the motor bulkhead 176 to allow rotation of the rotating air switch 116 within the opening 184. The regenerator side plate 262 is dimensioned to fit within the circular opening 188 in the regenerator bulkhead 178 to allow rotation of the rotating air switch 116 within the opening 188. The clearance seals, 118, 119 are preferably noncontacting clearance seals, e.g., air gaps. In this embodiment noncontacting clearance seals 118, 119 are rim seals, e.g. small gaps between the circumference of the circular openings, 188, 184 and the respective side plate 262, 260. Thus clearance seal 118 between the opening 184 and the motor side plate 260 prevents scraping of the rotating air switch 116 against the circular opening 184 while sealing air flow. The clearance seal 119 between the opening 188 and the regenerator side plate 262 prevents scraping of the rotating air switch 116 against the circular opening 188 while sealing air flow. In this alternative mounting schema, a side plate 260, 262 of the rotating air switch 116 is placed into the corresponding openings 184, 188 of one bulkhead 176, 178, then the other bulkhead 178, 176 is positioned such that the other opening 188, 184 encompasses the other side plate 262, 260 of the rotating air switch 116. The clearance seals (rim seals) 118, 119 are air gaps of approximately 0.015 inches and prevent full contact of the side plates 260, 262 with the respective bulkheads 176, 178.

In either way of mounting the rotating air switch 116, the motor side plate 260 has a single air switch motor side plate opening 270. Preferably motor side plate opening 270 is a quarter circle (e.g., subtends an angle of approximately 90°), pie shaped opening. As is used herein throughout, "pie shaped" refers to a shape bounded on two sides by concentric circular arcs of different radii and bounded on the other two sides by radial lines. The regenerator side plate 262 has two air switch regenerator side plate openings 272 and 274. Preferably, the regenerator side plate openings 272 and 274 are each quarter circle (e.g., subtend an angle of approximately 90°), pie shaped openings and are spaced approximately 90° apart. A manifold 276 rigidly extends between the two circular side plates 260, 262 maintaining them in a parallel spaced relationship. The manifold 276 connects the motor side plate opening 270 with one of the regenerator side plate openings 272. As best shown in FIGS. 5, 6, 12A and 12B, the manifold 276 has four major sides. These major sides are a shaft side portion 277, an opposite portion 278, a first side portion 279 and a second side portion 280. The first side portion 279 extends between the portion 277 and opposite portion 278. The second side portion 280 is disposed shaft side opposite portion 2,79 and connects portion 277 and portion 278. Preferably, as best shown in FIG. 12A, the shaft side portion 277 is a small planar portion extending between first side portion 279 and second side portion 280. Opposite portion 279 is a large circular arc portion smaller in outer radius than the side plates 260, 262 but concentric therewith.

Alternatively, as best shown in FIG. 12B, the manifold 276 is pie shaped. Thus the shaft side portion 277 is a small circular arc curved portion extending between first side portion 279 and second side portion 280, and the opposite portion 278 is a large circular arc portion concentric with the shaft side portion 277. Opposite portion 278 is smaller in outer radius than side plates 260, 262 but concentric therewith.

As shown in FIGS. 5, 6, 12A and 12B, the manifold portions 277, 278, 279, 280 of the rotating air switch 116, collectively form a fresh air passageway in the rotating air switch.

As best illustrated in FIGS. 12A and 12B, the three portions 279, 277 and 280 may be preferably bent of a single piece of sheet metal, or other suitable metal material. The large circular arc portion 278 is also made of sheet metal and has a pair of sides or tabs 288 (partially shown in phantom lines). The sides 288 are suitably bent and shaped so that they may be fastened to the first side portion 279 and to the second side portion 280. The bent sides 288 provide additional strength to the rotating air switch 116. The sides 288 are preferably welded to side portions 279, 280. (The weld material is not shown.) Alternatively the rotating air switch may be formed of an injection molded plastic material, such as, but not limited to polyvinyl chloride plastics (PVC), or fabricated of a cast metal. When the rotating air switch 116 is injection molded or cast, the tabs 288 are optional.

Each side plate 260, 262 has an aperture disposed in the center of the side plate. The motor side plate 260 has center aperture 281; the regenerator side plate 262 has center aperture 282. The rotating air switch further has two braces 283, 284 extending from the motor side plate 260 to the regenerator side plate 262. The braces 283, 284 serve to maintain the side plates 260, 262 in a fixed generally parallel geometry. The braces 283, 284 are preferably identically constructed elongated rectangles 285 with an angled bend 286 running the length of the rectangle 285. The bend 286 preferably adds additional strength to each of the braces 283, 284. Regenerator side plate opening 274 has two sides 271, 273. The braces 283, 284 are preferably disposed near sides 271, 273 of the opening 274.

The rotating air switch further has a shaft receiving portion 287 extending from the motor side plate 260 to the regenerator side plate 262 and centered on the center apertures 281, 282. Center aperture 281 and center aperture 282 are centered with respect to each other and spaced in a generally parallel spaced relationship to each other. The shaft side portion 277 of manifold 276 is adjacent to and preferably in contacting, e.g., abutting, relationship with shaft receiving portion 287. Ends of shaft receiving portion 287 are preferably spot welded to side plates 260, 262. (The weld material is not shown).

Figure 7:
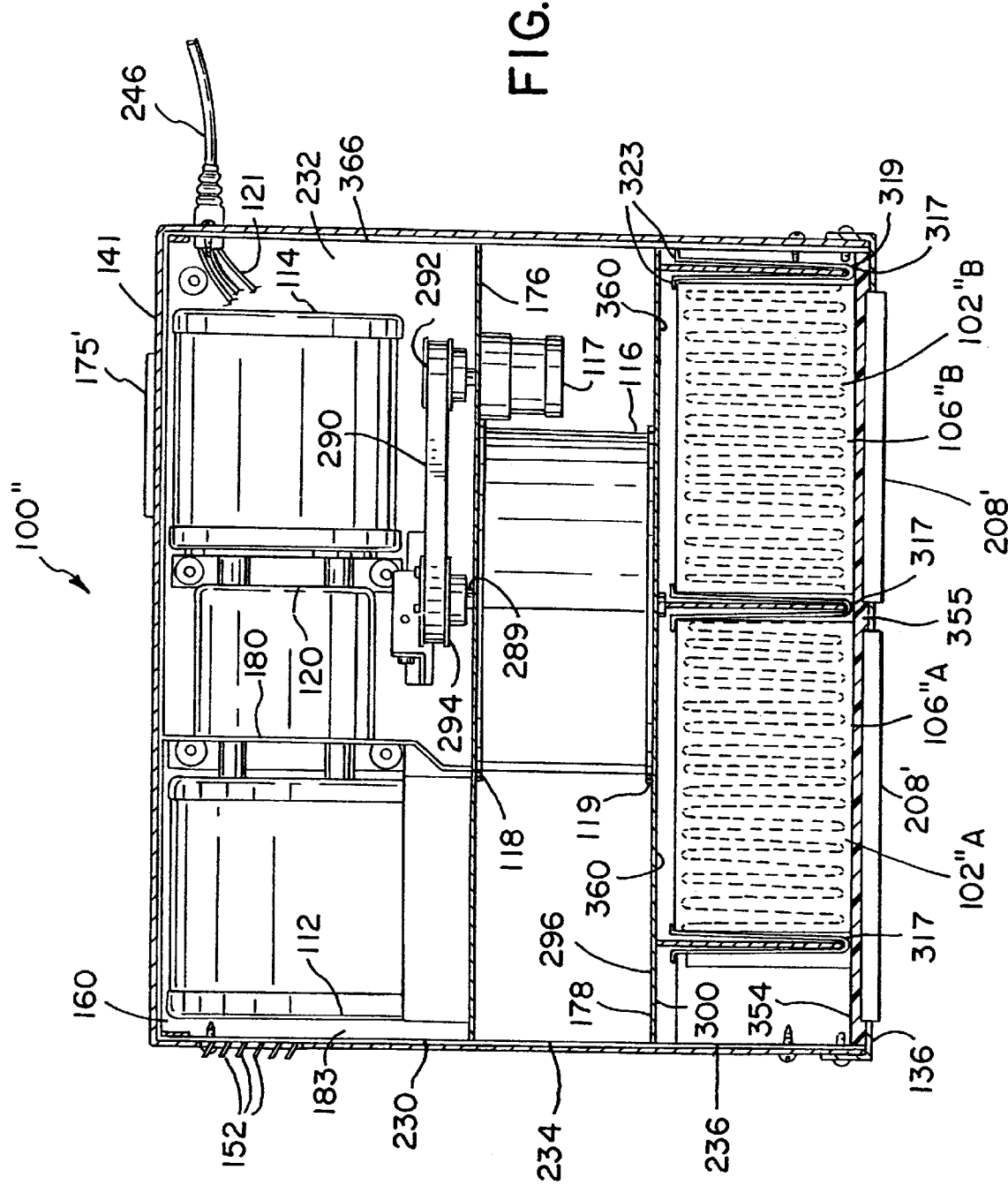
FIG. 7 is a top schematic view of the device of FIG. 1 illustrating the interior of the four compartments comprising the present invention, with upper casing top wall, a portion of the exterior cover, and a portion of the sealing material removed and with the pleated folds of the regenerative heat exchanger shown schematically in hidden line.

The rotating air switch 116 is mounted on a shaft 289, as is best shown in FIG. 7. Shaft 289 passes through the center apertures 281, 282 of each respective side plate 260, 262 and through the shaft receiving portion 287. The rotating air switch 116 is driven in a conventional manner by the small gear motor 117 using convention means, e.g., through a timing belt 290 and two pulleys 292 and 294. The motor side plate 262 has a second aperture 295 therein. The second aperture 295 is suitably dimensioned for accepting a set screw (not shown) which is attached to pulley 294. A hole (not shown) is drilled or tapped into the pulley 294 to accept the set screw. In this manner the pulley 294 is locked with the rotating air switch 116.

The gear motor 117 turns pulley 292 which drives timing belt 290 which, in turn, drives pulley 294, forcing it to turn. Since pulley 294 and the rotating air switch 116 are locked and centered about the common shaft 289, the rotating air switch 116 is forced to rotate. In operation the shaft 289 permits the rotating air switch 116 full 360° continuous rotation. This arrangement advantageously simplifies the operation of the HRV as compared to the prior art devices utilizing periodic acute angled back/forth rotation.

The stale airstream, which is forced into the third compartment 234 between the two bulkheads 176, 178 by the stale air blower 112, can only exit that region through the rotating air switch side plate opening 274, e.g., the opening not covered by the manifold 276. Effectively, a stale air passageway is created by the first and second side portions 279, 280, the shaft receiving portion 287, and the motor side plate 260 and regenerative side plate 262. The stale airstream then flows through a portion of the opening 188 in the regenerator bulkhead 178 and into the fourth compartment 236, containing the regenerative heat exchangers 102"A–102"D.

The regenerator bulkhead 178 has an interior side 296 facing the motor bulkhead 176 and an opposite exterior side 300 facing the regenerative heat exchangers 102"A–102"D. On the exterior side 300 of the regenerator bulkhead 178, there are four bulkheads which together with the casing and regenerator bulkhead 178 form the four regenerator manifolds 182A–182D for holding the regenerative heat exchangers 102"A–102"D. There is preferably a horizontal regenerator bulkhead 302; a center vertical bulkhead 304; a left vertical bulkhead 306 and a right vertical bulkhead 308. Four rectangular manifolds 182A–182D with the same dimensions are thus formed, with the top wall 138 of the upper casing 130 forming top walls of two of the regenerator manifolds (182A–182B) and the bottom wall 160 of the lower casing 132 forming bottom walls of the remaining two regenerator manifolds (182C–182D). Each of the regenerator manifolds 182A–182D has an identical manifold width 312, an identical manifold height 314 and an identical manifold depth 316. Each of the regenerator manifolds 182A–182D has vertical edges 309 corresponding to portions of the vertical bulkheads 304, 306, and 308 which are oriented toward the exterior cover 136 when the rectangular housing 122 of the HRV 100" is assembled.

Preferably a filter stop 317 is slid onto each vertical edge 309. Each identically dimensioned filter stop 317 is preferably a generally "V" shaped rectangular member having a vertex 319 and two sides 321 extending from the vertex 319. A generally perpendicular lip 323 extends from each side 321 of the "V". The vertex 319 of the "V" is slightly curved to accommodate a thickness of one of the edges 309. The sides 321 of the filter stop 317 are spaced from each other at a distance sufficient to snugly engage against a respective vertical bulkhead 304, 306, 308. The lips 323 are spaced at a distance from the vertex 319 of the "V" to correspond to the regenerative heat exchanger depth 356. The lips 323 from adjacent pairs of filter stops 317 function to limit the travel of the regenerative heat exchanger in the regenerator manifold. Preferably the filter stop 317 is made of a lightweight flexible metal; most preferably filter stop 317 is made of 0.020 inch thick aluminum sheeting.

The four rectangular regenerative heat exchangers 102"A–102"D are placed in the respective rectangular regenerator manifolds 182A–182D. The travel of each of the regenerative heat exchangers 102"A–102"D toward the regenerator bulkhead 178 is limited by the lips 323 of adjacent pairs of filter stops 317. The regenerative heat exchangers 102"A–102"D are identically dimensioned and constructed. FIGS. 9A–9D illustrate the detailed structure of a most preferred prior art pleated HEPA filter material regenerative heat exchanger labeled as 102", which may be anyone of regenerative heat exchangers 102"A–102"D. Alternatively, the regenerative heat exchangers 102" shown in FIG. 9F may be used in the present invention and placed in manifolds 182A–182D. These structures of the pleated HEPA filter material regenerative heat exchanger 102" (with and without the glue bead 111) have been previously described herein.

The preferred pleat density for the regenerative heat exchanger 102" (with or without the glue bead 111 ) is 6 or more pleats per inch, however a pleat density of 5 pleats per inch may be used. The upper range of the pleat density is a function of the thickness of the filter material (media), the depth of the pleating and whether or not a glue bead is used in providing rigidity to the filter. The pleat density is important because the total cross sectional area of filter material is proportional to the pleat density. The HEPA filter material has a high resistance to air flow, hence, a large cross sectional area is important for reasonable flow. The pleat density of 6 pleats per inch advantageously provides a cross section area of nearly 789 square inches of HEPA filter material per heat exchanger when constructed according to Example 1.

Each of the regenerative heat exchangers 102"A–102"D has a heat exchanger width 350 and a heat exchanger height 352, and a heat exchanger depth 357, which are somewhat less than corresponding dimensions for the manifold width 312, manifold height 314, and manifold depth 316. Stationary seals 354 are used with the regenerative heat exchanger 102", to force air flow to go through the regenerative heat exchanger 102" and not around. An example of preferred compressible sealing material 355 of the stationary seal 354 is the compressible foam gasket 355 having the plurality of openings 356 therethrough. The foam gasket 355 is suitably dimensioned to fit within the exterior cover 136. The foam gasket 355 is preferably a closed cell foam, commercially available from McMaster-Carr Supply Company, Chicago, Ill., as FOAM-SEAL™ polyvinyl chloride(PVC) foam or insulmide polyimide foam. The foam gasket 355 is preferably cut of a sheet of ¼ inch to 3/16 inch thick closed cell foam. Openings 356 are cut in the foam gasket 355. Each opening 356 in the foam gasket 355 is suitably dimensioned to align with frame openings 110 on the regenerative heat exchangers 102" when the regenerative heat exchangers 102"A–102"D are loaded into the manifolds 182A–182D and the housing 122 is assembled. For the HEPA filter heat exchanger 102"A–102"D, it is important to seal off air flow leaking around the filter in the regenerator manifold. The foam gasket 355 is placed inside the exterior cover 136. When the exterior cover 136, the upper casing 130 and the lower casing 132 are fastened together, the foam gasket 355 is compressed, thereby sealing air flow around each filter 102"A–102"D. The gasket 355 is preferably made of commercially available 3/16 inch thick polyvinyl (PVC) foam sheeting.

Alternatively, as best shown in FIG. 14, HRV 100" may be constructed without the filter stops 317 and without the foam gasket 355. In this aspect of HRV 100", the stationary seal 354 includes a plurality of compressible seals 354', preferably woolen felt pads, placed in the regenerator manifolds 182A–182D next to the regenerative heat exchangers 102"A–102" in the manner disclosed in U.S. patent application Ser. No. 08/893,833, which disclosure, applicants hereby incorporate by reference. In this equivalent method of sealing, seals 354' seal off air flow leaking around a filter 102" when the filter 102" is placed in a regenerator manifold 182". All other aspects of this aspect of the present invention are as described herein throughout.

In either way of using stationary seal(s) 354, the regenerative heat exchanger 102" has the heat exchanger depth 357 which is sufficiently less than the depth 316 of the rectangular manifold 182. This difference in depth dimensions provides that a sufficient air distribution plenum 360 is formed between the inside climate side 108" of the regenerative heat exchanger 102" and the regenerator bulkhead 178. The volume of the plenum 360 is significantly less than a volume of air contained in the regenerative heat exchanger 102". Preferably, the volume of plenum 360 is 10% to 20% of the volume of the air contained in the preferred regenerative heat exchanger 102".

The volume of air contained in the regenerative heat exchanger 102" of the most preferred embodiment of pleated HEPA filter material is easily calculated. The air volume between adjacent pleats 105 is a solid triangular shaped volume approximated by a triangular cross sectional area 450 between a pair of adjacent pleats 105, and then multiplied by a height 452 of the pleat 105. All the air volumes are summed to approximate the volume of air in the regenerative heat exchanger 102". Where the glue bead 111 is present, the volume taken by the bead is approximated and subtracted from the aforementioned sum of all the air volumes. If the air plenum volume 360 is too large, then there is a dead volume generated, reducing the flow through the regenerative heat exchangers 102"A–102"D.

To continue explaining the workings of the HRV 100", the fresh air blower 114 draws air from a plenum 366 formed by the second compartment 232 and the motor side plate 260 of the rotating air switch 116. This plenum 366 has a volume approximately corresponding to the volume of the second compartment minus the volumes of the blower 114 and motor 120. The only opening is the opening 270 in the motor side plate 260. Hence, fresh air is drawn through opening 270. This opening is connected to the opening 272 of the regenerator side plate 262 by the manifold 276 of the rotating air switch 116. Thus, simultaneously a fresh airstream is drawn (forced) in through opening 272 of the regenerator side plate 262 while the stale airstream is blown out through opening 274.

As best shown in FIG. 8, the horizontal regenerator bulkhead 302 and the center vertical bulkhead 304 divide the circular opening 188 in the regenerator bulkhead 178 into four 90° quadrants (368, 370, 372, 374). Each quadrant is an opening into one of the four regenerator manifolds 182A–182D. Thus quadrant 368 opens into regenerator manifold 182A. Quadrant 370 opens into regenerator manifold 182B. Quadrant 372 opens into regenerator manifold 182D. Quadrant 374 opens into regenerator manifold 182C. As the rotating air switch 116 turns, each quadrant is exposed to the fresh air opening 272 of the regenerator side plate 262, then to the stale air opening 274, then to the fresh air opening 272, and so on.

The flow of the stale air out of the regenerative heat exchangers 102"A–102"D and the flow of the fresh air into the regenerative heat exchangers 102"A–102"D is illustrated schematically in FIGS. 13A–13D. The regenerative heat exchangers 102"A–102"D, stationary seals 354 and exterior cover 136 have been removed to best illustrate the travel of the rotating air switch 116 with respect to the regenerator manifolds 182A–182D. The arrows illustrate the air flow as will be discussed subsequently. FIG. 13A shows the rotating air switch in the position shown in FIG. 8. In actual operation, the regenerative heat exchangers 102"A–102"D, and the filter stops 317 (if used) are in place in the regenerator manifolds 182A–182D; the stationary seal(s) 354 is/are in place and the exterior cover 136 is attached as is shown in FIG. 1.

As best shown in FIG. 13A, for the rotating air switch 116 in the position shown with the bulkhead 304 bisecting the opening 274 and also bisecting the opening 272, (e.g., the position shown in FIG. 8) fresh air is drawn in through the lower two regenerator manifolds 182C–182D while stale air is blown out through the upper two regenerator manifolds 182A and 182B.

Referring now to FIG. 13B, assuming a clockwise rotation, a quarter turn (i.e., 90°) of the rotating air switch 116 from the one shown in FIG. 13A, the right two regenerator manifolds (182B, 182D) receive an outward flow of stale air while the two leftmost regenerator manifolds (182A, 182C) receive an inward flow of fresh air.

Referring now to FIG. 13C, a half turn (i.e., 180°) of the rotating air switch 116 position as from the one shown in FIG. 13A, the lower two regenerator manifolds (182C, 182D) receive an outward flow of stale air while the upper two regenerator manifolds (182A, 182B) receive an inward flow of fresh air. Thus in a 180 degree turn there is a reciprocating air flow in a regenerator bed.

Referring now to FIG. 13D, for a three quarters (i.e., 270°) of a turn of the rotating air switch position from the one shown in FIG. 13A, he left two regenerator manifolds (182A, 182C) receive an outward flow of stale air while the right two regenerator manifolds (182B, 182D) receive an inward flow of fresh air.

In this way, each regenerator manifold 182A–182D, and each regenerative heat exchanger 102"A–102"D, respectively, contained therein, receives a reciprocating flow of stale air flowing outward to the outside climate, followed by fresh air flowing inward to the inside climate. Heat and moisture (if any) are thus transferred from the outwardly flowing stale air to the inwardly flowing fresh air by the regenerator matrix 104". Since the regenerative heat exchangers 102"A–102"D are made of a pleated HEPA filter material, the inward flow of fresh air passing through the regenerative heat exchangers is not only provided with heat and moisture, but is also filtered. Likewise the outwardly flowing stale air, in addition to releasing heat and moisture on the heat exchange matrix 104"A–104"D, is also filtered as it passes through the regenerative heat exchangers 102"A–102"D.

The HRV 100" uses a number of clearance seals which are noncontacting, e.g., they are air gaps. As previously described, there is a clearance seal 118 between the motor side plate 260 of the rotating air switch 116 and the motor bulkhead 176. There is a clearance seal 119 between the regenerator side plate 262 of the rotating air switch and the regenerator bulkhead 178.

Furthermore, there are two face clearance seals between the horizontal regenerator bulkhead 302, and the regenerator side plate 262 and also two face clearance seals between the center vertical regenerator bulkhead 304 and the regenerator side plate 262. These four noncontacting clearance seals 380, 382, 384 and 386 are best shown on FIG. 8 and are preferably air gaps of approximately 0.015 inches, but may suitably range from 0.005 inches to 0.035 inches. Clearance seal 380 is between the top portion of vertical bulkhead 304 and side plate 262 forming an air leakage path between regenerator manifold 182A and 182B. Clearance seal 384 is between the bottom portion of vertical bulkhead 304 and side plate 262 forming an air leakage path between regenerator manifold 182C and 182D. Clearance seal 382 is between the right portion of horizontal bulkhead 302 and side plate 262 forming an air leakage path between regenerator manifold 182B and 182D. Clearance seal 386 is between the left portion of horizontal bulkhead 302 and side plate 262 forming an air leakage path between regenerator manifold 182A and 182C. Each of these noncontacting clearance seals 118, 119, 380, 382, 384, 386 is between positively pressurized stale air emerging from the stale air blower 112 and negatively pressurized air entering the fresh air blower 114. Hence, all clearance seal leakage causes stale air to enter the fresh airstream entering the fresh air blower 114 without entering the regenerative heat exchangers 102"A–102"D. This has the effect of reducing the ventilation rate, however there is no effect on the level of filtration. Advantageously, the clearance seal leakage of clearance seals 118, 119, 380, 382, 384, and 386 does not reduce heat recovery, nor filtration efficiency. In contrast, much of the seal leakage in the prior art rotating wheel regenerator has the effect of reducing heat recovery. Indeed, if a rotating regenerator wheel were made of HEPA filter material, the seal leakage would cause ventillation air to bypass the HEPA filter, thereby defeating the HEPA filtration.

As best shown in FIGS. 1–16D, for the HRV 100", the fresh filtered airstream is driven by the fresh air blower 114 out through openings 175 and enters the room directly. The filtered stale air stream exits through openings 208 in the exterior cover 136.

The invention may be modified. Although the present invention preferably utilizes four regenerator manifolds 182A–182D and four stationary regenerative heat exchangers 102"A–102"D, the number of regenerator manifolds and regenerative heat exchangers can be different than four. Two can be used, for example, by simply removing the center vertical bulkhead 304. In this case, there will be part of the time when stale airstream flows directly to the fresh air blower 114. This is known in the art as flow "short-circuiting". The amount of time that this occurs can be reduced by reducing the angle of the preferred pie shaped openings 270, 272, 274 to less than 90°. Reducing the angle to less than 90° does, however, increases flow resistance through the openings 270, 272, 274. The preferred embodiment of the rotating air switch 116 having approximately 90° angled pie shaped openings 270, 272 and 274, with the two openings 272, 274 spaced approximately 90° apart, provides the largest opening for air flow to and from the regenerative heat exchangers 102"A–102"D and is most desirable because it provides minimal air pressure drop.

Instead of a separate gear motor 117 to operate the rotating air switch 116, power can be taken from the electric blower motor 120. This reduces cost of constructing the HRV 100" and operating the HRV 100" but, makes it more difficult to stop the rotation of the rotating switch 116 while the blowers 112 and 114 are operating.

The clearance seals 118, 119 around the rotating air switch 116 may be replaced by tighter contact seals, as is known in the art, since flow through the clearance seals causes some stale air to return to the fresh airstream.

The housing 122, bulkheads 176, 178, 180, 302, 304, 306, 308. baffle 187 and air switch 116 of the HRV 100" of the present invention can be fabricated of sheet metal, using conventional metal fabricating techniques. Alternatively they made be made of plastics, such as, but not limited to PVC, using suitable plastic molding techniques. Commercially available components are used for the blowers, blower motor, switches, gear motor, pulleys, timing belt, electrical wire and electrical outlet materials used in the construction of the HRV 100".

Also, providing the device of the present invention with the additional optional gear motor switch 244 (which is used to just turn off and on the gear motor) and its associated wiring makes the device of the present invention a convertible device, e.g., convertible between operating as a heat recovery ventilator (which provides air filtration, as well as, heat and moisture exchange) and operating as only a console air cleaning/filtration device. Thus the convertible device eliminates the need for two separate devices. The operation of HRV 100" has been explained in detail above as to how both filtration and heat and moisture exchange of the air occurs when the rotating air switch 16 is operating, e.g., turning. The HRV 100" can be operated as a console HEPA air cleaning device by not operating the rotating air switch 116, e.g. turning off gear motor 117 using switch 244, but, leaving the blowers operating. This may be done in two ways. If the device is left in the window frame 124 at this time, it acts as a source control filtering incoming fresh air and filtering outgoing stale air. Here the rotating air switch 116 will no longer rotate but instead will be in a stationary or fixed position relative to any of the regenerative heat exchangers 102"A–102"D. A fresh air stream will flow into the HRV 100" through the openings 208 in the exterior cover 136, pass through one or more of the pleated HEPA filter material regenerative heat exchangers 102"A–102"D and be filtered from outdoor particulates, allergens and/or pollutants. At this point source control of pollutant, allergens and particles from the outside fresh air occurs The filtered fresh air then enters into the opening 272 in the air switch 116. The filtered fresh air is then transported to the second compartment 232 where the fresh filtered air is forced out of the housing 122 through openings 175 as previously described. Meanwhile, at the same time stale air enters openings 150, 152, 174 on housing 122, and is moved through the blower 112 in the first compartment 230 into the third compartment 234 and into the air switch 116. It is transported from the air switch 116 into the fourth compartment 236 where it passes through one or more of the pleated HEPA filter material regenerative heat exchangers 102"A–102"D where the stale indoor air is filtered. The filtered stale air then flows out of the openings 208 in the exterior cover 136 of the housing 122. Since the openings 272 and 274 in the air switch 116 are approximately 90° apart, different regenerative heat exchangers 102"A–102"D are used for the fresh air stream and for the stale air stream.

There is a second way the present invention can be used as an air cleaning device, when the rotating air switch is not operating, and additional switch 244 and its associated wiring is present on the device. Here the device HRV 100" is removed from the window frame 124 and placed within the room of the structure and operated as a stand alone console HEPA air cleaning device. It operates as just previously described but instead of a fresh air stream entering the device through openings 208 in exterior cover 136, it is stale room air that enters the device. The stale room air also enters openings 150, 152, and 174 as just previously described, however since the device is totally in the room, both stale air streams are filtered and discharged into the room. Since there is no reciprocating action when the air switch 116 is turned off (e.g., not rotating), the heat and moisture is not exchanged between the respective airstreams, but the air is filtered, as it passes through the HEPA filter material.

The present invention is further explained by the following examples which should not be construed by way of limiting the scope of the present invention.

EXAMPLE 1

An HRV was constructed according to the disclosure above using sheet metal for the housing, all bulkheads, baffle and rotating air switch, using commercially available components for the blowers, blower motor, switches, electrical cord, plug, wiring, gear motor, pulleys and timing belt, and using a plurality of compressible seals 354' which were felt wool pads, placed around each rectangular heat exchanger, as shown in FIG. 14. The blower used was a DAYTON™ low profile blower, stock number 4C826 commercially available in the GRAINGER 1997 CATALOG(NO.388), of W.W.Grainger, Inc., Palatine Ill. The gear motor used was a HURST® instrument motors unit, commercially available from the aforementioned GRAINGER 1997 CATALOG, stock number 6Z540. The HRV had a continuously variable blower switch which also served as the on-off switch for both the blower and the gear motor which drove the rotating air switch. There was an additional on-off switch for the gear motor which allowed the gear motor to be turned off while the blower remained on.

The rectangular regenerative heat exchanger HEPA filter beds were purchased from Columbus Industries, Inc. of Ashville, Ohio. This pleated HEPA filter material was listed as "3282 media at 6 pleats per inch with a 1 inch glue spacing". The HEPA filter material was about 0.015±0.0010 inches thick.

The rectangular regenerative heat exchangers HEPA filters/regenerator beds made by Columbus Industries, Inc. were made by transversely accordian pleating a strip of HEPA filter material having 1" inch glue bead spacings on the strip to form a HEPA filter unit having V-shaped pleats. The HEPA filter unit was glued along the four sides of the periphery of the HEPA filter unit into a chipboard frame. The dimensions of the assembled regenerative heat exchanger was about 2.81 inches high (pleat height) by about 6.4 inches wide by about 2.9 inches deep (pleat depth) with a frequency of 6 pleats per inch. Thus there were about 38 pleat edges across the 6.4 inch width. The frame opening was about 5⅝ inches by about 2.5 inches. The thickness of the chipboard used in the chipboard frame was about 0.020 inches. Each glue bead was about 1/16 inch high by about 1/16 inch thick. The glue beads contacted each other except for about 0.2 inches from the pleat folds. The pleats were approximately parallel for much of the pleat depth. (The pleat depth of the regenerative heat exchanger is the depth in the air flow direction.) Thus the spacing from adjacent pleat edge to adjacent pleat edge was about 0.050 inches. The period of time of rotation of the rotating air switch was 6 seconds for a 360° turn. The HRV was placed in a window opening.

The HRV had the following measured performance characteristics with the blower on "high":

Maximum power requirement: 85 W
Maximum ventilation rate: 40 CFM
Effectiveness (sensible): 75%
The housing dimensions of the HRV were (depth×width× height): 13"×16"×7½"

The ventilation rate of 40 CFM was sufficient to provide 0.2 of an air change per hour for a 1500 square-foot residence. When the device was run with the HEPA filter regenerative filter heat exchanger material, it provided over 2.5 filtered air changes per hour for a 10-foot-by-12-foot bedroom with an 8 foot ceiling. This provided excellent air quality for an allergy or asthma sufferer for healthy sleeping.

The sensible heat recovery effectiveness of 75% was excellent. When the outside temperature was 40° F. less that the inside temperature, the heat loss was only about 126 W. The blower motor in the second compartment was placed so that its heat returned to the structure. This positive heat is not counted in the loss of 126 W.

EXAMPLE 2

The HRV made according to Example 1 was operated as a standard console HEPA filter air filtration device to filter indoor room air. The HRV was left in the window, but the gear motor was turned off, while the blowers remained on. Thus the air switch, no longer rotated, but remained in a stationary position. When this occurred, there was balanced flow filtered ventillation without heat recovery. The balanced air flow rate was about 40 CFM. There are times when this is desirable, for example, on a cool summer night with a hot building. In this mode of operation the HRV also performed the function of source control, filtering outdoor air of pollutants, particulates, and/or allergens.

EXAMPLE 3

The HRV made according to Example 1 was operated as a standard console HEPA air filtration device to filter indoor room air. The HRV was removed from the window and placed within a room of a structure. The gear motor was turned off while the blowers were turned onto high. When this occurred, there was balanced flow filtered air flow without heat recovery. The flow rate when using the HRV as a console HEPA filter air filtration device was about 80 CFM. This air flow is about twice as great as in Example 1.

While the present invention has now been described and exemplified with some specificity, those skilled in the at will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

What is claimed is:

1. A heat recovery ventilator for use in ventilating a room, comprising:
    means for venting a stale airstream of an indoor climate to the outside air;
    means for supplying a fresh airstream from the outside air of an outside climate;
    at least two stationary regenerative heat exchangers made of a pleated HEPA filter material; and
    a rotating air switch for transferring the stale airstream to the regenerative heat exchangers from the means for venting the stale airstream of the indoor climate and for transferring the fresh airstream from the regenerative heat exchangers to the means for supplying the fresh airstream from the outside air of the outside climate, said rotating air switch being rotatably mounted and including:
    (a) a first circular side plate having an air flow opening therein,
    (b) a second circular side plate having a pair of air flow openings, said second plate spaced apart and disposed opposed and parallel to said first plate, and
    (c) a single manifold extending from said air flow opening in said first side plate to one of said pair of said air flow openings in said second side plate, said manifold enclosing said air flow opening in said first side plate and said one of said air flow openings in said second side plate and forming a fresh air passage way for transferring the fresh airstream from the regenerative heat exchangers to the means for supplying the fresh airstream from the outside air of the outside climate, said other opening in said second side plate forming a stale air passageway for transferring the stale airstream from the means for venting the stale airstream of the indoor climate to the regenerative heat exchangers; and wherein air flows in opposite directions through the same regenerative heat exchanger.

2. The heat recovery ventilator of claim 1, wherein said air switch is isolated from the outside climate by said regenerative heat exchangers.

3. The heat recovery ventilator of claim 1, further comprising a plurality of noncontacting clearance seals, one said noncontacting clearance seal disposed between said first circular plate of said rotating air switch and both the means for venting the stale airstream of the indoor climate and the means for transferring the fresh airstream from the outside air of the outside climate, and said remaining noncontacting clearance seals disposed between said second circular plate and said stationary regenerative heat exchangers.

4. The heat recovery ventilator of claim 1, further comprising four regenerative heat exchangers.

5. The heat recovery ventilator of claim 1, wherein said pleated HEPA filter material has a pleat density of 6 pleats per inch.

6. The heat recovery ventilator of claim 1, wherein said HEPA filter material captures at least 99.97% of particles having a diameter greater than 0.3 microns.

7. The heat recovery ventilator of claim 1, wherein said HEPA filter material is rated at least 85% Dust-Spot Efficiency percentage as measured by ASHRAE Standard 52.1-1992, Dust-Spot Procedure.

8. The heat recovery ventilator of claim 6, wherein said HEPA filter material captures at least 99.97% of particles having a diameter greater than 0.3 microns.

9. The heat recovery ventilator of claim 6, wherein said HEPA filter material is rated at least 85% Dust-Spot Efficiency percentage as measured by ASHRAE Standard 52.1-1992, Dust-Spot Procedure.

10. A heat recovery ventilator for use in a room, comprising a housing, two blowers, at least two stationary regenerative heat exchangers made of a pleated HEPA filter material, a shaft, a single rotating air switch mounted on said shaft, a motor for driving said blowers and said shaft, one of said blowers for forcing a stale airstream out of the room; the other of said blowers for forcing a fresh airstream into the room, said air switch, in use, alternately imparting the stale airstream from one said blower to a regenerative heat exchanger, then imparting the fresh airstream to that same heat exchanger and through said other blower, when said air switch rotates in a 180° turn, wherein said rotating air switch has:
   a first side plate having an opening and having a center shaft aperture, a second side plate having two openings spaced from each other, and a center shaft aperture,
   a single manifold extending from said first side plate to said second side plate, wherein said manifold connects said opening of said first side plate with one of said openings in said second side plate forming a fresh air passageway, and
   a shaft receiving portion extending from said first side plate to said second side plate;
   wherein said rotating switch is disposed upon said shafts, said shaft disposed in said shaft receiving portion, and wherein, in use, the fresh airstream flows from said regenerative heat exchangers through said fresh air passageway and is forced out by said other blower, and wherein said other opening of said second side plate along with a portion of the manifold and a portion of the shaft receiving portion form a stale air passageway from said one blower to said regenerative heat exchangers, for transferring the stale airstream to said regenerative heat exchangers.

11. The heat recovery ventilator of claim 10, wherein said housing has:
   (a) first compartment containing said one blower, said first compartment having a plurality of openings therein for forcing the stale airstream to flow into said housing and through said one blower,
   (b) a second compartment containing said other blower and said motor, said second compartment having a plurality of openings therein for permitting the fresh airstream to exit the housing and to enter the room,
   (c) a third compartment containing said rotating air switch, and
   (d) a fourth compartment containing said regenerative heat exchangers, said fourth compartment having a plurality of openings therein for forcing the stale airstream out of said fourth compartment and for allowing the fresh airstream to be drawn into said fourth compartment.

12. The heat recovery ventilator of claim 11, wherein
   (a) said first compartment is next to said second compartment and shares a common blower bulkhead,
   (b) said third compartment is adjacent to both said first compartment and said second compartment and shares a common motor bulkhead with said first compartment and said second compartment, said motor bulkhead having a first opening into said first compartment and a second opening into said second compartment, and
   (c) said fourth compartment is spaced from said first and second compartments and is adjacent to said third compartment, said fourth compartment sharing a common regenerator bulkhead with said third compartment, said regenerator bulkhead having an opening therein, said rotating air switch disposed in said third compartment with one end of said rotating air switch adjacent the opening in the regenerator bulkhead and the other end of said rotating air switch adjacent to the opening in the motor bulkhead between the second and third compartments.

13. A heat recovery ventilator for use in ventilating a room, comprising means for venting a stale airstream of an indoor climate to the outside air, means for supplying a fresh airstream from the outside air of an outside climate, at least two stationary regenerative heat exchangers made of a pleated HEPA filter material and a rotating air switch for transferring the stale airstream to the regenerative heat exchangers from the means for venting the stale airstream of the indoor climate and for transferring the fresh airstream from the regenerative heat exchangers to the means for supplying the fresh airstream from the outside air of the outside climate, said rotating air switch being rotatably mounted and including:
   (a) a first circular side plate having an air flow opening therein,
   (b) a second circular side plate having a pair of air flow openings, said second plate spaced apart and disposed opposed and parallel to said first plate, and
   (c) a single manifold extending from said air flow opening in said first side plate to one of said pair of said air flow openings in said second side plate, said manifold enclosing said air flow opening in said first side plate and said one of said air flow openings in said second side plate and forming a fresh air passage way for transferring the fresh airstream from the regenerative heat exchangers to the means for supplying the fresh airstream from the outside air of the outside climate, said other opening in said second side plate forming a stale air passageway for transferring the stale airstream from the means for venting the stale airstream of the indoor climate to the regenerative heat exchangers; and wherein air flows in opposite directions through the same regenerative heat exchanger.

* * * * *